US012165565B2

(12) United States Patent
Im et al.

(10) Patent No.: US 12,165,565 B2
(45) Date of Patent: Dec. 10, 2024

(54) DISPLAY DEVICE

(71) Applicant: Samsung Display Co., LTD., Yongin-si (KR)

(72) Inventors: Tae Gon Im, Seongnam-si (KR); Jong Jae Lee, Seoul (KR); Soo Yeon Kim, Namyangju-si (KR); Jun Pyo Lee, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/902,574

(22) Filed: Sep. 2, 2022

(65) Prior Publication Data

US 2023/0196974 A1 Jun. 22, 2023

(30) Foreign Application Priority Data

Dec. 16, 2021 (KR) ........................ 10-2021-0180235

(51) Int. Cl.
*G09G 3/00* (2006.01)
*G09G 3/20* (2006.01)
(Continued)

(52) U.S. Cl.
CPC ......... *G09G 3/2096* (2013.01); *G09G 3/3233* (2013.01); *G09G 3/3291* (2013.01);
(Continued)

(58) Field of Classification Search
CPC .. G09G 3/2096; G09G 3/3233; G09G 3/3291; G09G 2300/0819; G09G 2300/0828; G09G 2300/0842; G09G 2310/0291; G09G 2310/08; G09G 2330/021; G09G 2330/045;
(Continued)

(56) References Cited

U.S. PATENT DOCUMENTS

2006/0279505 A1* 12/2006 Nagato ................ G09G 3/3611 345/98
2007/0118781 A1* 5/2007 Kim ..................... G09G 3/3291 714/727
2008/0007504 A1* 1/2008 Kawaura ................ G09G 3/006 345/904
2011/0260746 A1* 10/2011 Huang .................. G09G 3/006 324/760.01
(Continued)

FOREIGN PATENT DOCUMENTS

KR 10-1450919 10/2014
KR 10-2016-0027534 3/2016
(Continued)

OTHER PUBLICATIONS

European Search Report for European Patent Application No. 22214026.1, dated Mar. 22, 2023.

*Primary Examiner* — Chanh D Nguyen
*Assistant Examiner* — Nguyen H Truong
(74) *Attorney, Agent, or Firm* — KILE PARK REED & HOUTTEMAN PLLC

(57) ABSTRACT

A display device includes a display panel including data lines, line capacitors respectively connected to the data lines, and pixels receiving a data voltage from the data lines, and a data driver supplying the data voltage to the pixels through the data lines and supplying different charging voltages respectively to the line capacitors through the data line. The data driver senses voltage change of at least one of the data lines occurring in case that at least one of the line capacitors is charged or discharged.

22 Claims, 17 Drawing Sheets

(51) Int. Cl.
*G09G 3/3233* (2016.01)
*G09G 3/3291* (2016.01)

(52) U.S. Cl.
CPC ............... *G09G 2300/0819* (2013.01); *G09G 2300/0828* (2013.01); *G09G 2300/0842* (2013.01); *G09G 2310/0291* (2013.01); *G09G 2310/08* (2013.01); *G09G 2330/021* (2013.01); *G09G 2330/045* (2013.01); *G09G 2330/12* (2013.01)

(58) Field of Classification Search
CPC ........ G09G 2330/12; G09G 5/00; G09G 3/00; G09G 3/20; G09G 3/30; G09G 3/32; G09G 3/36; G09G 3/3266; G09G 3/3258; G09G 3/3275; G11C 7/00; G11C 7/10; H03M 1/12; H03M 1/66; H03M 1/68; H03M 1/74; H03M 1/76; H02B 1/00; G01R 31/00; G01R 31/26; G05F 1/40; H03F 3/04; H03F 3/45
See application file for complete search history.

(56) References Cited

U.S. PATENT DOCUMENTS

| | | | | |
|---|---|---|---|---|
| 2013/0083001 | A1* | 4/2013 | Jeong | G09G 3/3266 345/82 |
| 2014/0176622 | A1* | 6/2014 | Jung | G09G 3/3233 345/76 |
| 2016/0379548 | A1* | 12/2016 | Shin | G09G 3/2096 345/214 |
| 2019/0340966 | A1* | 11/2019 | Lee | G09G 3/006 |
| 2020/0027379 | A1 | 1/2020 | Kim et al. | |
| 2020/0168163 | A1 | 5/2020 | Kim et al. | |
| 2022/0005913 | A1* | 1/2022 | Xiao | H10K 59/1213 |
| 2022/0383826 | A1* | 12/2022 | Choi | G09G 3/3233 |
| 2023/0011297 | A1* | 1/2023 | Choi | G09G 3/36 |
| 2023/0109442 | A1* | 4/2023 | Cheng | G06F 3/0412 345/173 |

FOREIGN PATENT DOCUMENTS

| | | |
|---|---|---|
| KR | 10-2017-0002098 | 1/2017 |
| KR | 10-2019-0139600 | 12/2019 |

* cited by examiner

OUT: OUT1, OUT2, OUT3, OUT4, ..., OUT(4n-1), OUT(4n)
SEN: SEN1, SEN2, SEN3, SEN4
DOL: DOL1, DOL2, DOL3, DOL4, ..., DOL(4n-1), DOL(4n)
DL: DL1, DL2, DL3, DL4, ..., DL(4n-1), DL(4n)

OUT: OUT1, OUT2, OUT3, OUT4, ..., OUT(4n-1), OUT(4n)
SEN: SEN1, SEN2, SEN3, SEN4
DOL: DOL1, DOL2, DOL3, DOL4, ..., DOL(4n-1), DOL(4n)
DL: DL1, DL2, DL3, DL4, ..., DL(4n-1), DL(4n)

OUT: OUT1, OUT2, OUT3, OUT4, ..., OUT(4n-1), OUT(4n)
SEN: SEN1, SEN2, SEN3, SEN4
DOL: DOL1, DOL2, DOL3, DOL4, ..., DOL(4n-1), DOL(4n)
DL: DL1, DL2, DL3, DL4, ..., DL(4n-1), DL(4n)

OUT: OUT1, OUT2, OUT3, OUT4, ..., OUT(4n-1), OUT(4n)
SEN: SEN1, SEN2, SEN3, SEN4
DOL: DOL1, DOL2, DOL3, DOL4, ..., DOL(4n-1), DOL(4n)
DL: DL1, DL2, DL3, DL4, ..., DL(4n-1), DL(4n)

OUT: OUT1, OUT2, OUT3, OUT4, ..., OUT(4n-1), OUT(4n)
SEN: SEN1, SEN2, SEN3, SEN4
DOL: DOL1, DOL2, DOL3, DOL4, ..., DOL(4n-1), DOL(4n)
DL: DL1, DL2, DL3, DL4, ..., DL(4n-1), DL(4n)

OUT: OUT1, OUT2, ..., OUT(2n-1), OUT(2n)
SEN: SEN1, SEN2
DOL: DOL1, DOL2, ..., DOL(2n-1), DOL(2n)
DL: DL1, DL2, ..., DL(2n-1), DL(2n)

OUT: OUT1, OUT2, ..., OUT(2n-1), OUT(2n)
SEN: SEN1, SEN2
DOL: DOL1, DOL2, ..., DOL(2n-1), DOL(2n)
DL: DL1, DL2, ..., DL(2n-1), DL(2n)

OUT: OUT1, OUT2, ..., OUT(2n-1), OUT(2n)
SEN: SEN1, SEN2
DOL: DOL1, DOL2, ..., DOL(2n-1), DOL(2n)
DL: DL1, DL2, ..., DL(2n-1), DL(2n)

DISPLAY DEVICE

CROSS-REFERENCE TO RELATED APPLICATION(S)

This application claims priority to and benefits of Korean Patent Application No. 10-2021-0180235 under 35 U.S.C. § 119, filed on Dec. 16, 2021, in the Korean Intellectual Property Office (KIPO), the entire contents of which are incorporated herein by reference.

BACKGROUND

1. Technical Field

Embodiments of the disclosure relate to a display device.

2. Description of Related Art

As information society develops, demand for display devices for displaying images has been increased in various fields. For example, display devices have been being applied to various electronic devices such as smartphones, digital cameras, notebook computers, navigation systems, and smart televisions. The display device may include a light-emitting element in which each pixel of a display panel emit light in a self-manner. Thus, the display device may display an image without a backlight unit for providing light to the display panel.

The display panel may include lines for supplying a signal or voltage. A short-circuit may occur between the lines. When the short-circuit occurs between the lines of the display panel, fire may occur in the display panel or the display panel may be damaged.

SUMMARY

Embodiments provide a display device capable of preventing fire in or damage to a display panel of the display device by sensing or detecting a short-circuit occurred in the display panel.

However, embodiments of the disclosure are not limited to those set forth herein. The above and other embodiments will become more apparent to one of ordinary skill in the art to which the disclosure pertains by referencing the detailed description of the disclosure given below.

According to an embodiment, a display device may include a display panel including data lines, line capacitors respectively connected to the data lines, and pixels receiving a data voltage from the data lines, and a data driver supplying the data voltage to the pixels through the data lines and supplying different charging voltages respectively to the line capacitors through the data lines. The data driver may sense voltage change of at least one of the data lines occurring in case that at least one of the line capacitors is charged or discharged.

The data driver may include a plurality of output circuits supplying the data voltage to the data lines, and a plurality of sensors supplying the different charging voltages to the line capacitors, respectively.

Each of the plurality of output units may include a digital-to-analog converter converting digital video data into analog data and generating the data voltage based on the analog data, and a first amplifier including a first input terminal connected to the digital-to-analog converter, a second input terminal receiving a reference voltage, and an output terminal connected to the data line.

The plurality of sensors may include a first sensor supplying a first charging voltage to a first data line of the data lines, and a second sensor supplying a second charging voltage different from the first charging voltage to a second data line of the data lines.

Each of the first and second sensors may include a second amplifier outputting the charging voltage and sensing the voltage change of the at least one of the data lines, and an analog-to-digital converter connected to the second amplifier converting an analog signal corresponding to the voltage change of the at least one of the data lines into digital data.

The analog-to-digital converter may generate a shut-down signal to stop an operation of the data driver in case that the change in the voltage of the data line is detected.

The device may further include a timing controller supplying digital video data to the data driver. The analog-to-digital converter may supply error data to the timing controller in case that the change of the voltage in the data line is detected.

The plurality of sensors may further include a third sensor supplying a third charging voltage different from the first and second charging voltages to a third data line among the data lines.

The first and third sensors may sense a short-circuit between the first and third data lines spaced apart from each other by the second data line interposed therebetween.

The display panel may further include a first voltage line supplying a first voltage to the pixels, a gate line supplying a gate signal to the pixels, and a second voltage line supplying a second voltage lower than the first voltage to the pixels. Each of the pixels may include a light-emitting element.

At least one of the plurality of sensors may sense the voltage change of the at least one of the data lines that is caused by charging the at least one of the line capacitors through a short-circuit between the first voltage line and the at least one of the data lines.

At least one of the plurality of sensors may sense the voltage change of the at least one of the data lines that is caused by discharging the at least one of the line capacitors through a short-circuit between the gate line and the at least one of the data lines.

At least one of the plurality of sensors may sense the voltage change of the at least one of the data lines that is caused by discharging the at least one of the line capacitors through a short-circuit between a first electrode of the light-emitting element and the at least one of the data lines.

At least one of the plurality of sensors may sense the voltage change of the at least one of the data lines that is caused by discharging the at least one of the line capacitors through a short-circuit between the second voltage line and the at least one of the data lines.

Each of the plurality of output units may supply the data voltage to the pixels during a data addressing period of a frame period, and may supply the different charging voltages respectively to the line capacitors during a rest period of the frame period.

According to an embodiment, a display device may include a display panel including first and second data lines, line capacitors respectively connected to the first and second data lines, and pixels receiving a data voltage from the first and second data lines, first and second output units supplying the data voltage to the pixels through the first and second data lines, respectively, a first sensor supplying a first charging voltage to the line capacitor connected to the first data line, and a second sensor supplying a second charging voltage different from the first charging voltage to the line capacitor connected to the second data line. At least one of the first and second sensors senses voltage change of the first or second data line that is caused by charging or discharging at least one of the line capacitors.

The first and second sensors may sense a short-circuit between the first and second data lines.

The display panel may further include a third data line. The device may further include a third sensor supplying a third charging voltage different from the first and second charging voltages to the third data line.

The first and third sensors may sense a short-circuit between the first and third data lines spaced apart from each other by the second data line interposed therebetween.

According to an embodiment, a display device may include a display panel including data lines, line capacitors respectively connected to the data lines, and pixels receiving a data voltage from the data lines, and a data driver supplying the data voltage to the pixels through the data lines and supplying different charging voltages respectively to the line capacitors through the data lines. The data driver may receive a first voltage higher than the charging voltage of at least one of the line capacitors, the first voltage increased from the charging voltage by charging the at least one of the line capacitors through a short-circuit occurred in the display panel, or receive a second voltage lower than the charging voltage of the at least one of the line capacitors, the second voltage decreased from the charging voltage by discharging the at least one of the line capacitors through the short-circuit occurred in the display panel.

According to the embodiments, the plurality of sensors of the display device may respectively supply different charging voltages to the line capacitors respectively connected to the plurality of data lines. When the short-circuit occurs in the display panel, the voltages of the data lines may change due to charge or discharge of the line capacitors. Therefore, at least one of the plurality of sensors may sense the voltage change in the data line such that an operation of the data driver or the power supply may stop based on the voltage change, thereby preventing fire in or damage to the display panel to protect the display device.

Effects according to the embodiments are not limited by those as described above, and further various effects are included in the disclosure.

BRIEF DESCRIPTION OF DRAWINGS

The above and other aspects and features of the disclosure will become more apparent by describing in detail embodiments thereof with reference to the attached drawings.

DETAILED DESCRIPTION OF THE EMBODIMENTS

Figure 1:
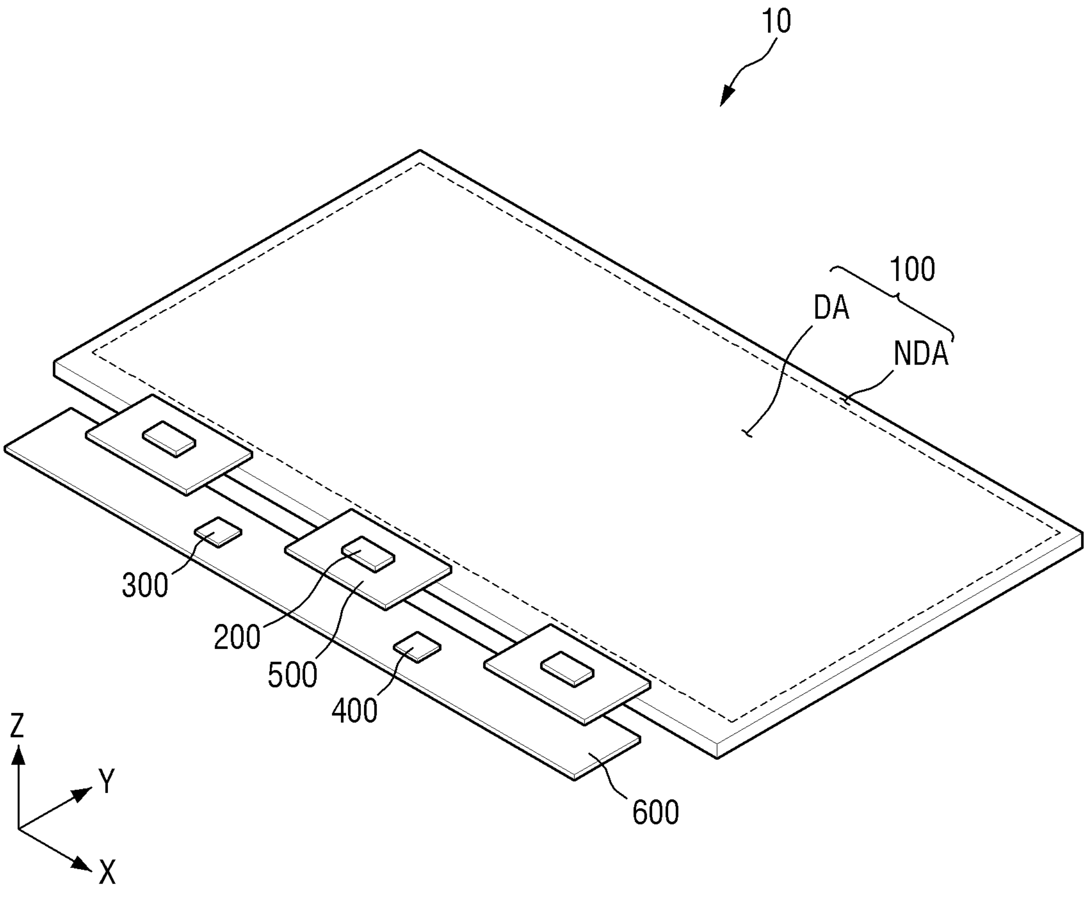
FIG. 1 is a schematic perspective view showing a display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation, not as terms of degree, and thus are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or overly formal sense, unless clearly so defined herein.

Hereinafter, detailed embodiments of the disclosure will be described with reference to the accompanying drawings.

FIG. 1 is a schematic perspective view showing a display device according to an embodiment.

Referring to FIG. 1, a display device 10 may display a moving image or a still image. The display device 10 may be used as a display screen for each of various products such as portable electronic devices such as a mobile phone, a smart phone, a personal computer (PC), a smart watch, a watch phone, a mobile communication terminal, an electronic notebook, an electronic book, a portable multimedia player (PMP), a navigation, and an ultra-mobile PC (UMPC), a television (TV), a laptop, a monitor, a billboard, internet of things (IOT), etc.

The display device 10 may include a display panel 100, a data driver 200, a timing controller 300, a power supply 400, a flexible film 500, and a circuit board 600.

The display panel 100 may be formed in a rectangular shape having a long side extending in the first direction (e.g., X-axis direction) and a short side extending in the second direction (e.g., Y-axis direction) intersecting the first direction (e.g., X-axis direction). A corner where the long side extending in the first direction (e.g., X-axis direction) and the short side extending in the second direction (e.g., Y-axis direction) meet with each other may be rounded to have a curvature or may be formed to have a right angle. A planar shape of the display panel 100 is not limited to the rectangular shape, and may be formed in other polygons, a circle, an oval, or the like. The display panel 100 may be formed to be flat. However, embodiments are not limited thereto. For example, the display panel 100 may include a curved portion formed on each of left and right ends thereof, and having a constant curvature or a varying curvature. The display panel 100 may be flexibly formed so that the display panel 100 is bendable, foldable, or rollable.

The display panel 100 may include a display area DA that displays an image and a non-display area NDA that is disposed around the display area DA. The display area DA may be a substantial area of the display panel 100. The display area DA may be disposed in an inner area of the display panel 100. The display area DA may include pixels displaying an image.

Each of the pixels may include a light-emitting element that emits light. The light-emitting element may include at least one of an organic light-emitting diode including an organic light-emissive layer, a quantum dot light-emitting diode including a quantum dot light-emissive layer, an inorganic light-emitting diode including an inorganic semiconductor, a micro light-emitting diode (Micro LED), and the like. However, embodiments are not limited thereto.

The non-display area NDA may be disposed adjacent to the display area DA. The non-display area NDA may be an area out of (or beyond) the display area DA. The non-display area NDA may be disposed to surround the display area DA. The non-display area NDA may constitute a side area of the display panel 100.

The non-display area NDA may include a gate driver, fan-out lines, and a pad. The gate driver may supply a gate signal to gate lines of the display area DA. The fan-out lines may electrically connect the data driver 200 to data lines of the display area DA. The pad may be electrically connected to the flexible film 500. For example, the pad may be disposed on a side of the display panel 100. The gate driver may be disposed on another side of the display panel 100 adjacent to the side thereof. However, embodiments are not limited thereto.

The data driver 200 may output signals and voltages that drive the display panel 100. The data driver 200 may supply a data voltage to the data lines. The data driver 200 may supply a power voltage to power lines and may supply a gate control signal to the gate driver. The data driver 200 may be formed in an integrated circuit (IC), and may be mounted on the flexible film 500 in a Chip on Film (COF) scheme. In an embodiment, the data driver 200 may be mounted on the non-display area NDA of the display panel 100 in a Chip on Glass (COG) scheme, a Chip on Plastic (COP) scheme, an ultrasonic bonding scheme, or the like.

The timing controller 300 may be mounted on the circuit board 600 and may receive digital video data and timing synchronization signals supplied from a display driver system or a graphic unit through a user connector provided on the circuit board 600. The timing controller 300 may align the digital video data (or control timings of digital video signals) to be adapted to a pixel arrangement structure based on the timing synchronization signals. The aligned (or adjusted) digital video data may be supplied to data driver 200. The timing controller 300 may generate a data control signal and the gate control signal based on the timing synchronization signal. The timing controller 300 may control a supply timing of the data voltage of the data driver 200 based on the data control signal, and may control a supply timing of the gate signal of the gate driver based on the gate control signal.

The power supply 400 may be mounted on the circuit board 600 and may supply the power voltage to the display panel 100 and the data driver 200. For example, the power supply 400 may generate a first voltage, a second voltage, a third voltage, and an initialization voltage to drive the pixel of the display panel 100 and the data driver 200. The first voltage may be a high potential voltage supplied to the pixel. The second voltage may be a low potential voltage supplied to the pixel. The third voltage may be greater than the second voltage and may be lower than the first voltage and may be supplied to the data driver 200.

The flexible film 500 may be disposed on the pad disposed on a side of the display panel 100. The flexible film 500 may be attached to the pad using a conductive adhesive member such as an anisotropic conductive film. The flexible film 500 may be electrically connected to the signal lines of the display panel 100 via an anisotropic conductive film. The display panel 100 may receive the data voltage, the first to third voltages, and the initialization voltage from the flexible film 500. For example, the flexible film 500 may be implemented as a flexible printed circuit board, a printed circuit board, a chip on film, or the like.

The circuit board 600 may be attached to the flexible film 500 by using a low-resistance high-reliability material such as an anisotropic conductive film or Self-Assembly Anisotropic Conductive Paste (SAP). The circuit board 600 may be electrically connected to the flexible film 500. The circuit board 600 may be implemented as a flexible printed circuit board or a printed circuit board.

Figure 2:
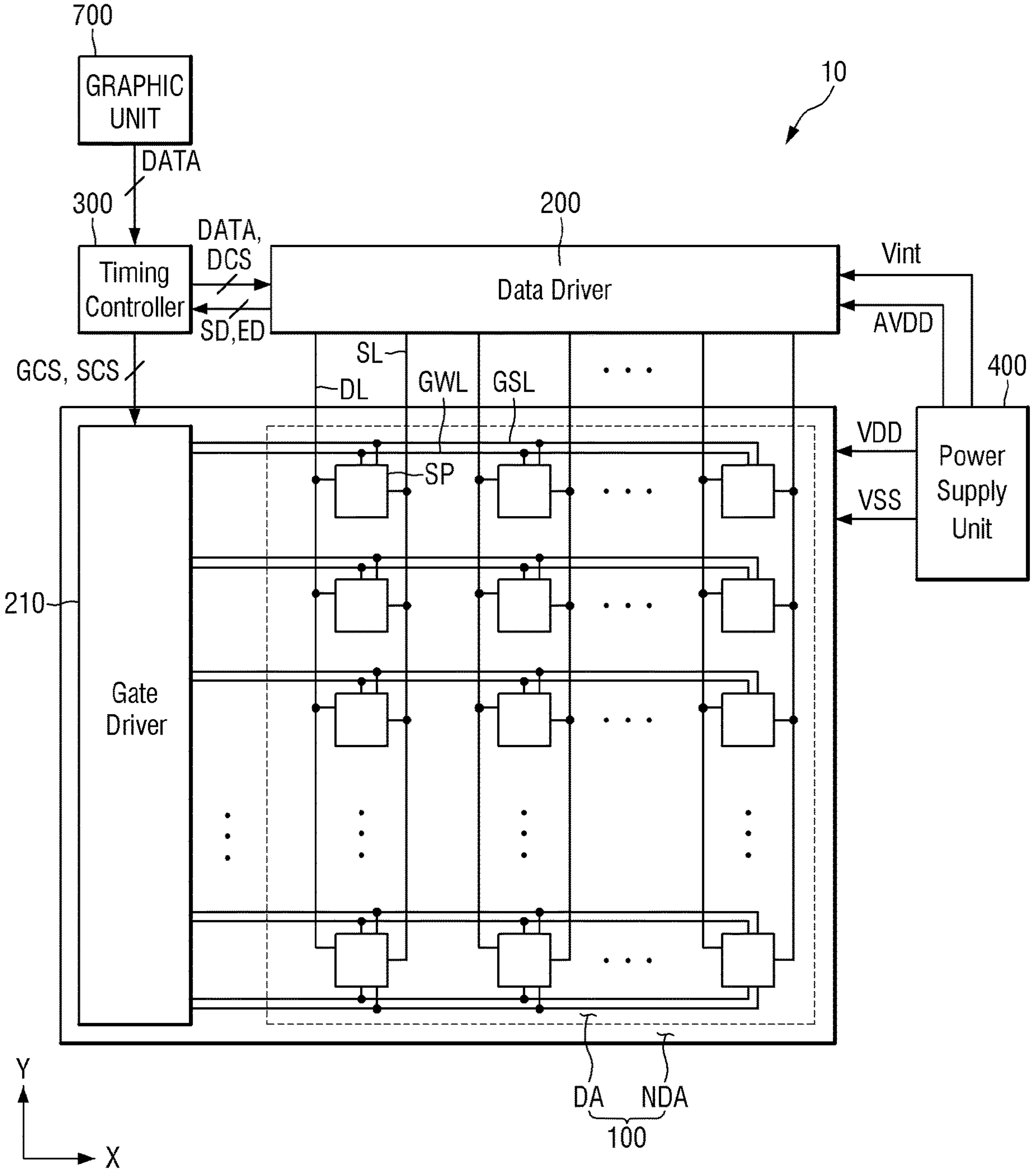
FIG. 2 is a schematic block diagram showing the display device according to an embodiment.

FIG. 2 is a schematic diagram showing a display device 10 according to an embodiment.

Referring to FIG. 2, the display device 10 may include the display panel 100, the data driver 200, the gate driver 210, the timing controller 300, the power supply 400, and the graphic unit 700.

The display area DA of the display panel 100 may include pixels SP. Each of the pixels SP may be connected to a first gate line GWL, a second gate line GSL, a data line DL, and a sensing line SL.

Each of the first and second gate lines GWL and GSL may extend in the first direction (e.g., X-axis direction). The first and second gate lines GWL and GSL may be spaced apart from each other in the second direction (e.g., Y-axis direction). The first and second gate lines GWL and GSL may be connected to and disposed between the gate driver 210 and the pixel SP. Each of the first and second gate lines GWL and GSL may supply a gate signal to the pixel SP.

The data line DL and the sensing line SL may extend in the second direction (e.g., Y-axis direction) and may be spaced apart from each other in the first direction (e.g., X-axis direction). The data line DL and the sensing line SL may be connected to and disposed between the data driver 200 and the pixel SP. The data line DL may supply the data voltage to the pixel SP. The sensing line SL may supply the initialization voltage to the pixel SP, and may receive a sensing signal from the pixel SP.

The data driver 200 may receive digital video data DATA and a data control signal DCS from the timing controller 300. The data driver 200 may generate the data voltage based on the digital video data DATA, and may supply the data voltage to the data line DL based on the data control signal DCS. For example, the data voltage may be supplied to a selected pixel SP among the pixels SP while being in synchronization with a first gate signal. The data voltage may determine luminance of the pixel SP. The data driver 200 may supply the sensing data SD received from the sensing line SL to the timing controller 300.

The data driver 200 may detect whether a short-circuit in the display panel 100 occurs or not. For example, the data driver 200 may sense or detect a short-circuit (or a short-circuit current) between the data lines DL, e.g., during a sensing period SEP or a rest period VBP. The data driver 200 may sense a short-circuit (or a short-circuit current) between adjacent data lines DL or non-adjacent data lines DL. In an embodiment, the data driver 200 may sense a short-circuit between the data line DL and a first or second voltage line VDDL or VSSL. In an embodiment, the data driver 200 may sense or detect a short-circuit between the data line DL and the first or second gate line GWL or GSL. In an embodiment, the data driver 200 may sense a short-circuit between the data line DL and the light-emitting element. When a short-circuit occurs in the display panel 100, the data driver 200 may generate a shut-down signal to stop an operation of the display panel 100. The data driver 200 may supply error data ERD to the timing controller 300 when the short-circuit occurs in the display panel 100.

The gate driver 210 may be disposed in the non-display area NDA of the display panel 100. For example, the gate driver 210 may be disposed in a side of the display panel 100. However, embodiments are not limited thereto. In an embodiment, the gate driver 210 may be disposed in each of both opposing sides of the display panel 100. In an embodiment, the gate driver 210 may be mounted on the flexible film 500.

The gate driver 210 may receive a first gate control signal GCS and a second gate control signal SCS from the timing controller 300. The gate driver 210 may generate a first gate signal based on the first gate control signal GCS and supply the first gate signal to the first gate line GWL. The gate driver 210 may generate a second gate signal based on the second gate control signal SCS and supply the second gate signal to the second gate line GSL. The gate driver 210 may sequentially supply the first gate signal to first gate lines GWL in a first order (or pattern). The gate driver 210 may sequentially supply the second gate signal to second gate lines GSL in a second order (or pattern). For example, the first order (or pattern) and the second order (pattern) may be different from each other or substantially same as each other.

The timing controller 300 may receive the digital video data DATA and a timing synchronization signal from the graphic unit 700. For example, the graphic unit 700 may be implemented as a graphic card (or a graphic processor) of the display device 10. However, embodiments are not limited thereto. The timing controller 300 may generate the data control signal DCS and the first and second gate control signals GCS and SCS based on the timing synchronization signal. The timing controller 300 may control a driving timing of the data driver 200 based on the data control signal DCS, and may control a driving timing of the gate driver 210 based on the first and second gate control signals GCS and SCS. The timing controller 300 may vary an operation frequency of the display panel 100 based on an input frequency of the digital video data DATA of the graphic unit 700.

The timing controller 300 may receive the sensing data SD from the data driver 200. The sensing data SD may sense or measure transistor characteristics such as electron mobility or a threshold voltage of a transistor in each of the pixels SP. The timing controller 300 may apply the sensing data SD to the digital video data DATA to compensate for the characteristics of the transistor in each of the pixels SP. The timing controller 300 may supply the digital video data DATA based on the sensing data SD to the data driver 200. For example, the sensing data SD may be stored in a separate memory disposed in the circuit board 600. However, embodiments are not limited thereto.

The timing controller 300 may receive the error data ERD from the data driver 200. The error data ERD may include information about the short-circuit in the display panel 100. When the timing controller 300 receives the error data ERD, the timing controller 300 may stop operations of the data driver 200 and the power supply 400, thereby preventing fire from occurring in the display panel 100 or the display panel 100 from being damaged, thereby protecting the display device 10.

The power supply 400 may generate a first voltage VDD, a second voltage VSS, a third voltage AVDD, and an initialization voltage Vint. The power supply 400 may supply the first voltage VDD to the pixels SP disposed on the display panel 100 via the first voltage line VDDL. The power supply 400 may supply the second voltage VSS to the pixels SP disposed on the display panel 100 via the second voltage line VSSL. For example, the first voltage VDD may be a high potential voltage capable of driving the pixel SP. Each of the first voltage VDD and the second voltage VSS may be supplied (e.g., commonly supplied) to the pixels SP. The power supply 400 may supply the third voltage AVDD and the initialization voltage Vint to the data driver 200. The third voltage AVDD may be supplied to at least one amplifier of the data driver 200. The initialization voltage Vint may be supplied to each of the pixels SP through the sensing line SL to initialize a first electrode of the transistor of the pixel SP or a first electrode of the light-emitting element.

Figure 3:
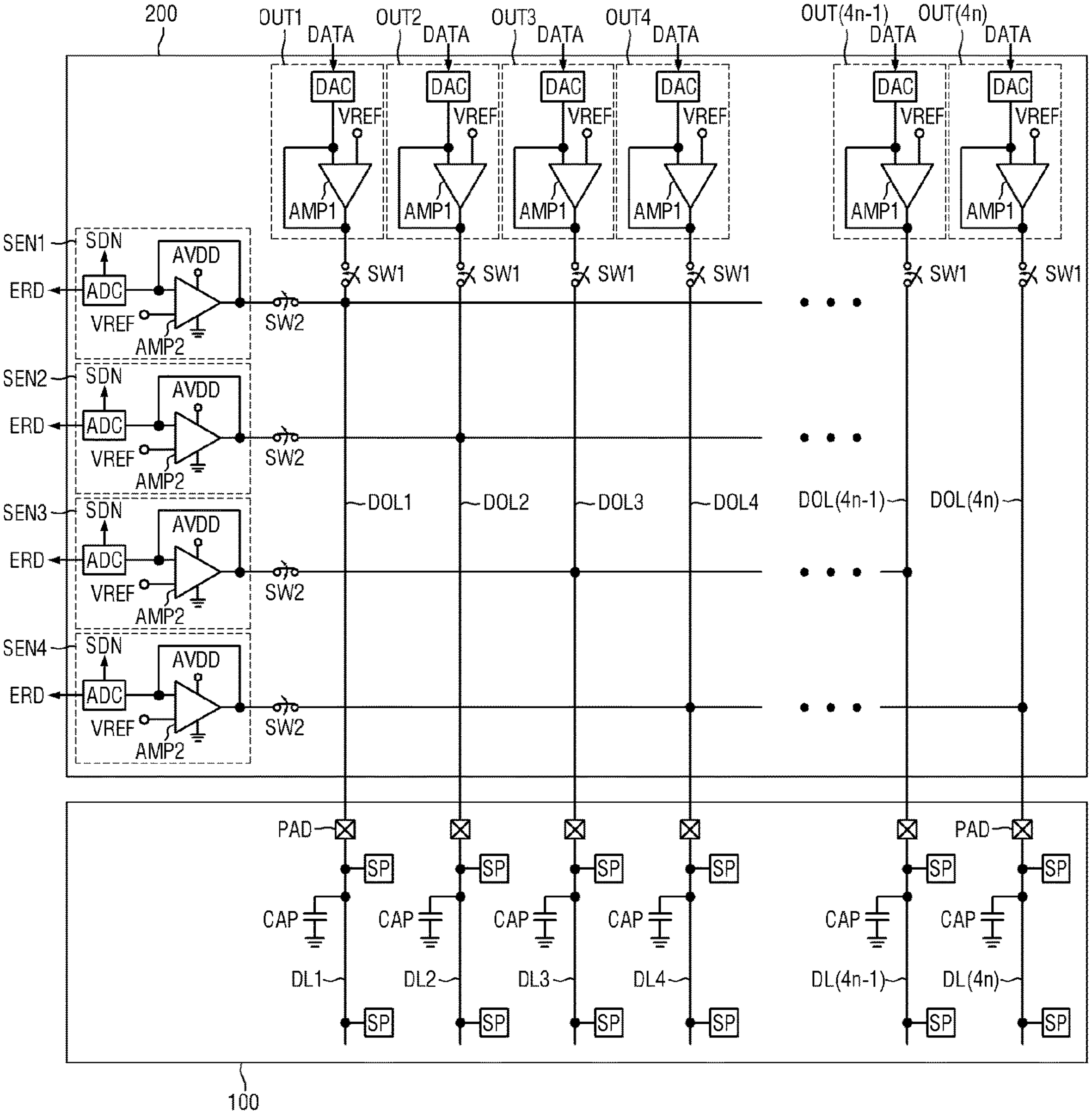
FIG. 3 is a schematic diagram showing a display panel and a data driver of the display device according to an embodiment.

FIG. 3 is a schematic diagram showing a display panel and a data driver of the display device according to an embodiment.

Referring to FIG. 3, the display panel 100 may include the pixel SP, the data line DL, a line capacitor CAP, and the pad PAD. The pixels SP may be connected to the data line DL. The pixels SP arranged in the same column may be connected to one data line DL. The data line DL may be connected to and disposed between the pad PAD and the pixel SP. Each of the line capacitors CAP may be connected to a corresponding data line DL. The line capacitor CAP may be connected to and disposed between the data line DL and a ground.

The data driver 200 may include an output unit OUT, a sensing unit SEN, first and second switching elements SW1 and SW2, and a data output line DOL.

The output unit OUT may receive the digital video data DATA and output the data voltage. Each of the outputs OUT may supply the data voltage to a corresponding data output line DOL when the first switching element SW1 is turned on. For example, the first switching element SW1 may be implemented as a transistor. However, embodiments are not limited thereto. The output unit OUT may include first to 4n-th output units OUT1 to OUT(4n), wherein n may include a positive integer. The data output line DOL may include first to 4n-th data output lines DOL1 to DOL(4n). The first output unit OUT1 may supply the data voltage to the first data output line DOL1. The 4n-th output unit OUT(4n) may supply the data voltage to the 4n-th data output line DOL(4n).

Each of the output units OUT may include a digital-to-analog converter DAC and a first amplifier AMP1. The digital-to-analog converter DAC may receive the digital video data DATA from the timing controller 300. The digital-to-analog converter DAC may convert the digital video data DATA into analog data to generate the data voltage. The digital-to-analog converter DAC may supply the data voltage to a first input terminal of the first amplifier AMP1.

The first input terminal of the first amplifier AMP1 may be connected to the digital-to-analog converter DAC. A second input terminal of the first amplifier AMP1 may receive a reference voltage VREF. The first input terminal of the first amplifier AMP1 may be connected to an output terminal of the first amplifier AMP1. The first amplifier AMP1 may operate as a buffer. The output terminal of the first amplifier AMP1 may be electrically connected to the data output line DOL via the first switching element SW1. Accordingly, the first amplifier AMP1 may supply the data voltage to the data output line DOL when the first switching element SW1 is turned on.

The sensing unit SEN may sense or detect a short-circuit in the display panel 100. Each of the sensing units SEN may supply a charging voltage to a corresponding data output line DOL when the second switching element SW2 is turned on. For example, the second switching element SW2 may be implemented as a transistor. However, embodiments are not limited thereto. The charging voltage may be charged in the line capacitor CAP via the data output line DOL, the pad PAD, and the data line DL. The sensing unit SEN may include first to fourth sensing units SEN1, SEN2, SEN3, and SEN4. The first sensing unit SEN1 may be electrically connected to the first, the fifth, . . . , the (4n−3)-th data output lines DOL1, DOL5, . . . , DOL(4n−3). The second sensing unit SEN2 may be electrically connected to the second, the sixth, . . . , the (4n−2)-th data output lines DOL2, DOL6 and DOL(4n−2). The third sensing unit SEN3 may be electrically connected to the third, seventh, . . . , the (4n−1)-th data output lines DOL3, DOL7, . . . , DOL(4n−1). The fourth sensing unit SEN4 may be electrically connected to the fourth, the eighth, . . . , the 4n-th data output lines DOL4, DOL8, . . . , DOL(4n).

Each of the sensing units SEN may include a second amplifier AMP2 and an analog-to-digital converter ADC. The second amplifier AMP2 may receive the third voltage AVDD, and may be electrically connected to a ground. The second amplifier AMP2 may output a charging voltage based on the third voltage AVDD. A first input terminal of the second amplifier AMP2 may be connected to the analog-to-digital converter ADC, when a second input terminal of the second amplifier AMP2 receives the reference voltage VREF. The first input terminal of the second amplifier AMP2 may be connected to an output terminal of the second amplifier AMP2. The second amplifier AMP2 may operate as a buffer. The output terminal of the second amplifier AMP2 may be electrically connected to the data output line DOL via the second switching element SW2. Accordingly, the second amplifier AMP2 may supply the charging voltage to the data output line DOL when the second switching element SW2 is turned on.

The second amplifier AMP2 may sense the change (or variation) in a voltage (e.g., voltage change or variation) of the data line DL. When a short-circuit occurs in the display panel 100, the line capacitor CAP may be charged or discharged, Thus, the voltage of the data line DL may be changed. The output terminal of the second amplifier AMP2 may sense or measure the change in the voltage of the data line DL via the pad PAD, the data output line DOL, and the second switching element SW2. The output terminal of the second amplifier AMP2 may be connected to the first input terminal thereof. Thus, the second amplifier AMP2 may supply an analog signal corresponding to the change in the voltage (e.g., voltage change) of the data line DL to the analog-to-digital converter ADC.

Embodiments are not limited to the illustration of FIG. 3. Each of the sensing units SEN may include second amplifiers AMP2. When each of the sensing units SEN includes the second amplifiers AMP2, the sensing unit may quickly and easily supply the charging voltage to the data output line DOL, and thus may precisely sense or measure the change in the voltage (e.g., voltage change) of the data line DL.

The analog-to-digital converter ADC may generate the shut-down signal SDN and the error data ERD when the voltage of the data line DL changes. The analog-to-digital converter ADC may receive the analog signal corresponding to the change in the voltage of the data line DL from the second amplifier AMP2. The analog-to-digital converter ADC may convert the analog signal to digital data and may generate the shut-down signal SDN and the error data ERD based on the digital data. The shut-down signal SDN may stop the operation of the data driver 200 to stop the operation of the display panel 100. The analog-to-digital converter ADC may supply the error data ERD to the timing controller 300.

Figure 4:
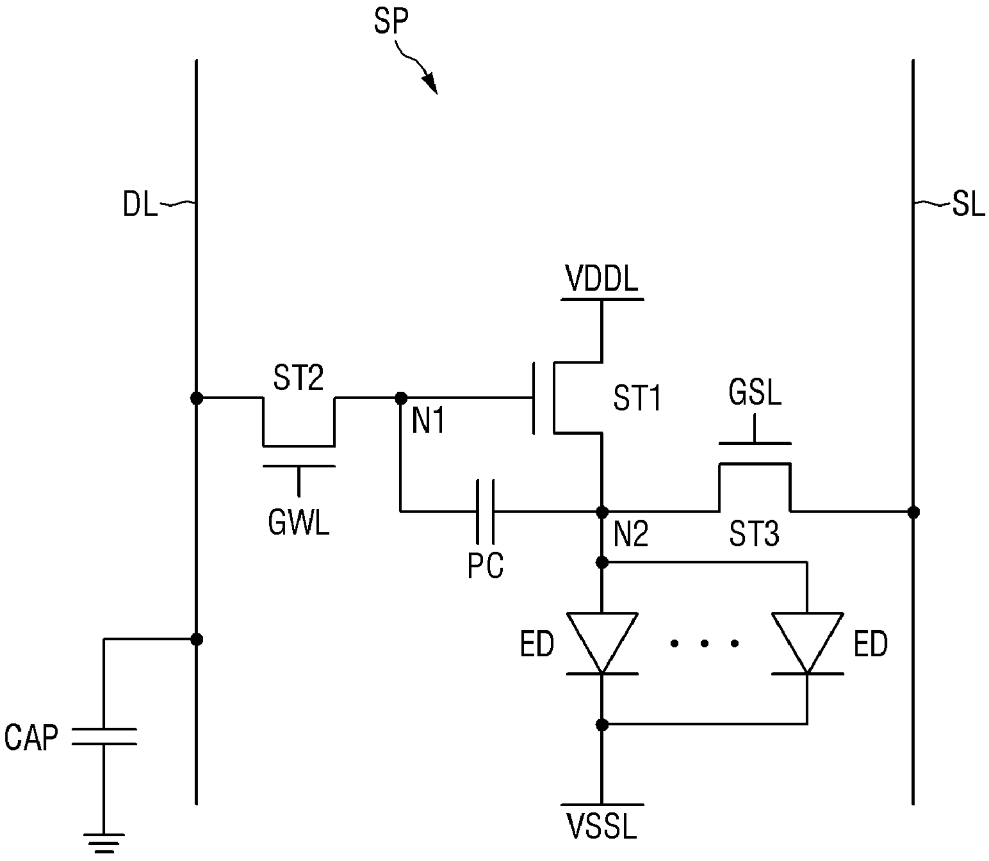
FIG. 4 is an equivalent circuit diagram showing a pixel of the display device according to an embodiment.

FIG. 4 is an equivalent circuit diagram showing a pixel of the display device according to an embodiment.

Referring to FIG. 4, each of the pixels SP may be connected to the first gate line GWL, the second gate line GSL, the data line DL, the sensing line SL, the first voltage line VDDL, and the second voltage line VSSL.

The pixel SP may include first to third transistors ST1, ST2, and ST3, a pixel capacitor PC, and light-emitting elements ED.

The first transistor ST1 may include a gate electrode, a drain electrode, and a source electrode. The gate electrode of the first transistor ST1 may be connected to a first node N1, a drain electrode thereof may be connected to the first voltage line VDDL, and a source electrode thereof may be connected to a second node N2. The first transistor ST1 may act or function as a driving transistor that adjusts a current flowing from the first voltage line VDDL to the light-emitting element ED based on a difference between voltages of the gate electrode and the source electrode thereof. The first transistor ST1 may control a current between the drain and the source (e.g., drive current) based on the data voltage applied to the gate electrode.

The light-emitting elements ED may receive the drive current to emit light. The light-emitting elements ED may be connected to each other in a parallel manner. However, embodiments are not limited thereto. An emission amount or luminance of the light-emitting element ED may be proportional to a magnitude (or amount) of the drive current. The light-emitting element ED may include at least one of an organic light-emitting diode including an organic light-emissive layer, a quantum dot light-emitting diode including a quantum dot light-emissive layer, an inorganic light-emitting diode including an inorganic semiconductor, a micro light-emitting diode (Micro LED), and the like. Embodiments are not limited thereto.

The first electrode of the light-emitting element ED may be connected to the second node N2. The first electrode of the light-emitting element ED may be connected to the source electrode of the first transistor ST1, the drain electrode of the third transistor ST3, and a second capacitor electrode of the pixel capacitor PC via the second node N2. A second electrode of the light-emitting element ED may be connected to the second voltage line VSSL.

The second transistor ST2 may be turned on based on the first gate signal of the first gate line GWL to connect the data line DL to the first node N1 as the gate electrode of the first transistor ST1. The second transistor ST2 may be turned on based on the first gate signal, thereby supplying the data voltage to the first node N1. A gate electrode of the second transistor ST2 may be connected to the first gate line GWL, a drain electrode of the second transistor ST2 may be connected to the data line DL, and a source electrode of the second transistor ST2 may be connected to the first node N1. The source electrode of the second transistor ST2 may be connected to the gate electrode of the first transistor ST1 and the first capacitor electrode of the pixel capacitor PC via the first node N1.

The third transistor ST3 may be turned on based on the second gate signal of the second gate line GSL to connect the sensing line SL to the second node N2 as the source electrode of the first transistor ST1. The third transistor ST3 may be turned on based on the second gate signal, so that the initialization voltage may be supplied to the second node N2, and the sensing signal may be supplied to the sensing line SL. A gate electrode of the third transistor ST3 may be connected to the second gate line GSL, a drain electrode thereof may be connected to the second node N2, and a source electrode thereof may be connected to the sensing line SL. The drain electrode of the third transistor ST3 may be connected to the source electrode of the first transistor ST1, the second capacitor electrode of the pixel capacitor PC, and the first electrode of the light-emitting element ED via the second node N2.

For example, the drain electrode and the source electrode of each of the first, second, and third transistors ST1, ST2, and ST3 are not limited to the above description, and may be exchanged with each other. Each of the first to third transistors ST1, ST2, and ST3 may be implemented as an N-type metal oxide semiconductor field effect transistor (MOSFET). However, embodiments are not limited thereto.

Figure 5:
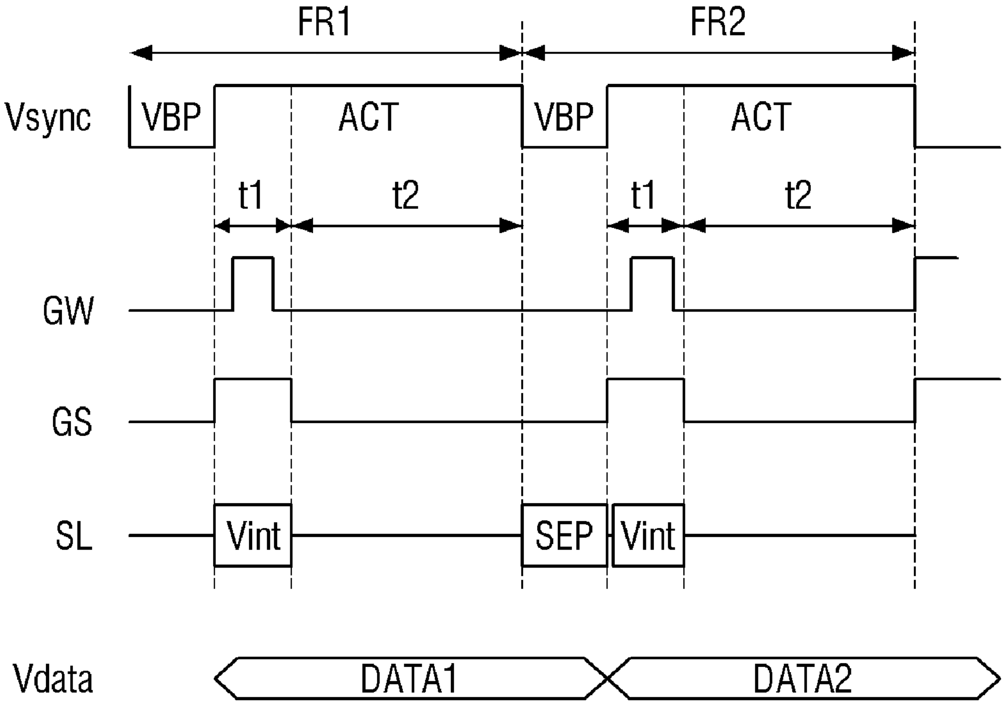
FIG. 5 is a timing diagram showing signals and voltages of the display device according to an embodiment.

FIG. 5 is a timing diagram showing signals and voltages of the display device according to an embodiment.

Referring to FIG. 5, the timing controller 300 may control the data driver 200 and the gate driver 210 based on a vertical synchronization signal Vsync. The vertical synchronization signal Vsync may have a low level and a high level during a frame period. The vertical synchronization signal Vsync may have a low level during a rest period VBP. The vertical synchronization signal Vsync may have a high level during an active period ACT. The pixels SP arranged in some rows among the pixels SP may be sensed by the data driver 200 during a sensing period SEP. The pixels SP arranged in the other rows of the pixel SP may maintain a luminance that they had in a previous active period ACT during the rest period VBP. Therefore, the sensing period SEP may be applied to pixels SP arranged in some rows during the rest period VBP.

The data driver 200 may receive first and second digital video data DATA1 and DATA2 from the graphic unit 700. The data driver 200 may output a first data voltage Vdata generated based on the first digital video data DATA1 during a first frame period FR1. The data driver 200 may output a second data voltage Vdata generated based on the second digital video data DATA2 during a second frame period FR2.

A first period t1 of each of the first and second frame periods FR1 and FR2 may be a data addressing period during which the data voltage is supplied to the pixels SP. A second period t2 of each of the first and second frame periods FR1 and FR2 may be a blank period (or an emission period) during which the data voltage is not supplied to the pixels SP.

The first gate signal GW may have a high level (e.g., a gate turn-on voltage) during the first period t1 (e.g., a data addressing period). The data driver 200 may supply the data voltage Vdata to the second transistor ST2 of the pixel SP. The second gate signal GS may have a high level (e.g., a gate turn-on voltage) during the first period t1. The data driver 200 may supply the initialization voltage Vint to the third transistor ST3 of the pixel SP. The pixel SP may emit light having luminance based on the data voltage Vdata during the second period t2 (e.g., an emission period).

The data driver 200 may sense or detect whether a short-circuit occurs in the display panel 100 during the rest period VBP. When the change in the voltage of the data line DL is sensed or detected during the rest period VBP, the data driver 200 may generate the shut-down signal to stop the operation of the display panel 100, and may supply the error data ERD to the timing controller 300. When the timing controller 300 receives the error data ERD, the timing controller 300 may stop the operation of each of the data driver 200 and the power supply 400, thereby preventing the display panel 100 from having fire therein and/or being damaged thereto, thereby protecting the display device 10.

Figure 6:
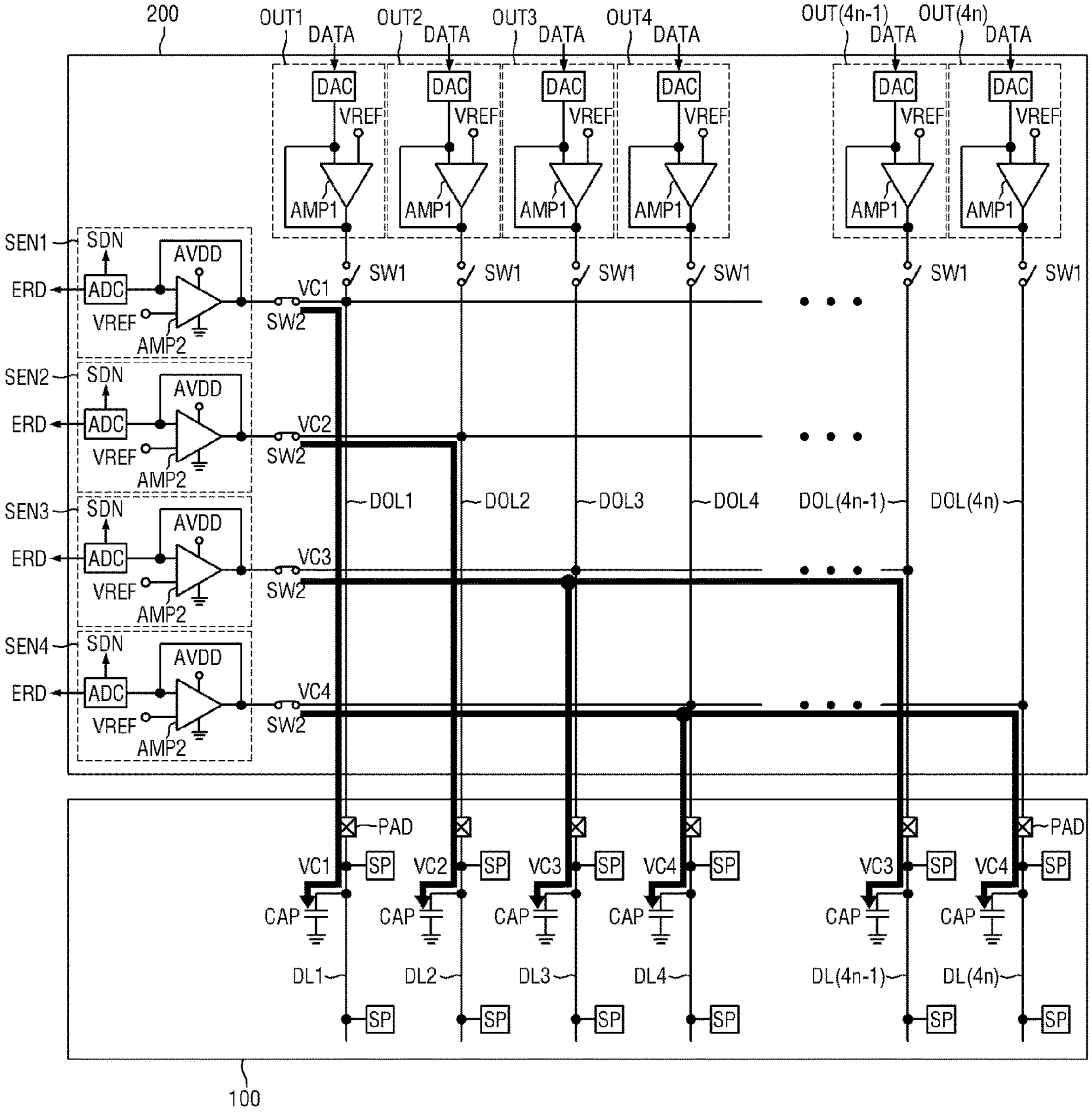
FIG. 6 is a schematic diagram showing an example of a process of charging a line capacitor of the display panel in the display device according to an embodiment.

FIG. 6 is a schematic diagram showing an example of a process of charging the line capacitor of the display panel in the display device according to an embodiment.

Referring to FIG. 6, each of the sensing units SEN may supply the charging voltage to a corresponding data output line DOL when the second switching element SW2 is turned on. For example, the second switching element SW2 may be implemented as a transistor. However, embodiments are not limited thereto. The charging voltage may be charged in the line capacitor CAP via the data output line DOL, the pad PAD, and the data line DL. The sensing unit SEN may include the first to fourth sensing units SEN1, SEN2, SEN3, and SEN4. The first sensing unit SEN1 may be electrically connected to the first, the fifth, . . . , the (4n−3)-th data output lines DOL1, DOL5, DOL(4n−3). The second sensing unit SEN2 may be electrically connected to the second, the sixth, . . . , the (4n−2)-th data output lines DOL2, DOL6 and DOL(4n−2). The third sensing unit SEN3 may be electrically connected to the third, the seventh, . . . , the (4n−1)-th data output lines DOL3, DOL7, . . . , DOL(4n−1). The fourth sensing unit SEN4 may be electrically connected to the fourth, the eighth, . . . , the 4n-th data output lines DOL4, DOL8, . . . , DOL(4n).

The first sensing unit SEN1 may supply a first charging voltage VC1 to the first, the fifth, . . . , the (4n−3)-th data output lines DOL1, DOL5, . . . , DOL(4n−3). The first charging voltage VC1 may be charged in the line capacitor CAP connected to the first, the fifth, . . . , the (4n−3)-th data lines DL1, DL5, . . . , DL(4n−3). The second sensing unit SEN2 may supply a second charging voltage VC2 to the second, the sixth, . . . , the (4n−2)-th data output lines DOL2, DOL6, . . . , DOL(4n−2). The second charging voltage VC2 may be charged in the line capacitor CAP connected to the is the second, the sixth, . . . , the (4n−2)-th data lines DL2, DL6, . . . DL(4n−2). The third sensing unit SEN3 may supply a third charging voltage VC3 to the third, seventh, . . . , the (4n−1)-th data output lines DOL3, DOL7, . . . , DOL(4n−1). The third charging voltage VC3 may be charged in the line capacitor CAP connected to the third, the seventh, . . . , the (4n−1)-th data lines DL3, DL7, . . . , DL(4n−1). The fourth sensing unit SEN4 may supply a fourth charging voltage VC4 to the fourth, the eighth, . . . , the 4n-th data output lines DOL4, DOL8, . . . , DOL(4n). The fourth charging voltage VC4 may be charged in the line capacitor CAP connected to the fourth, eighth, . . . , the 4n-th data lines DL4, DL8, . . . DL(4n).

The magnitudes (or levels) of the first to fourth charging voltages VC1, VC2, VC3, and VC4 may be different from each other. Accordingly, the line capacitors CAP respectively connected to the first to fourth data lines DL1, DL2, DL3, and DL4 may store therein voltages of different magnitudes (or levels).

Figure 7:
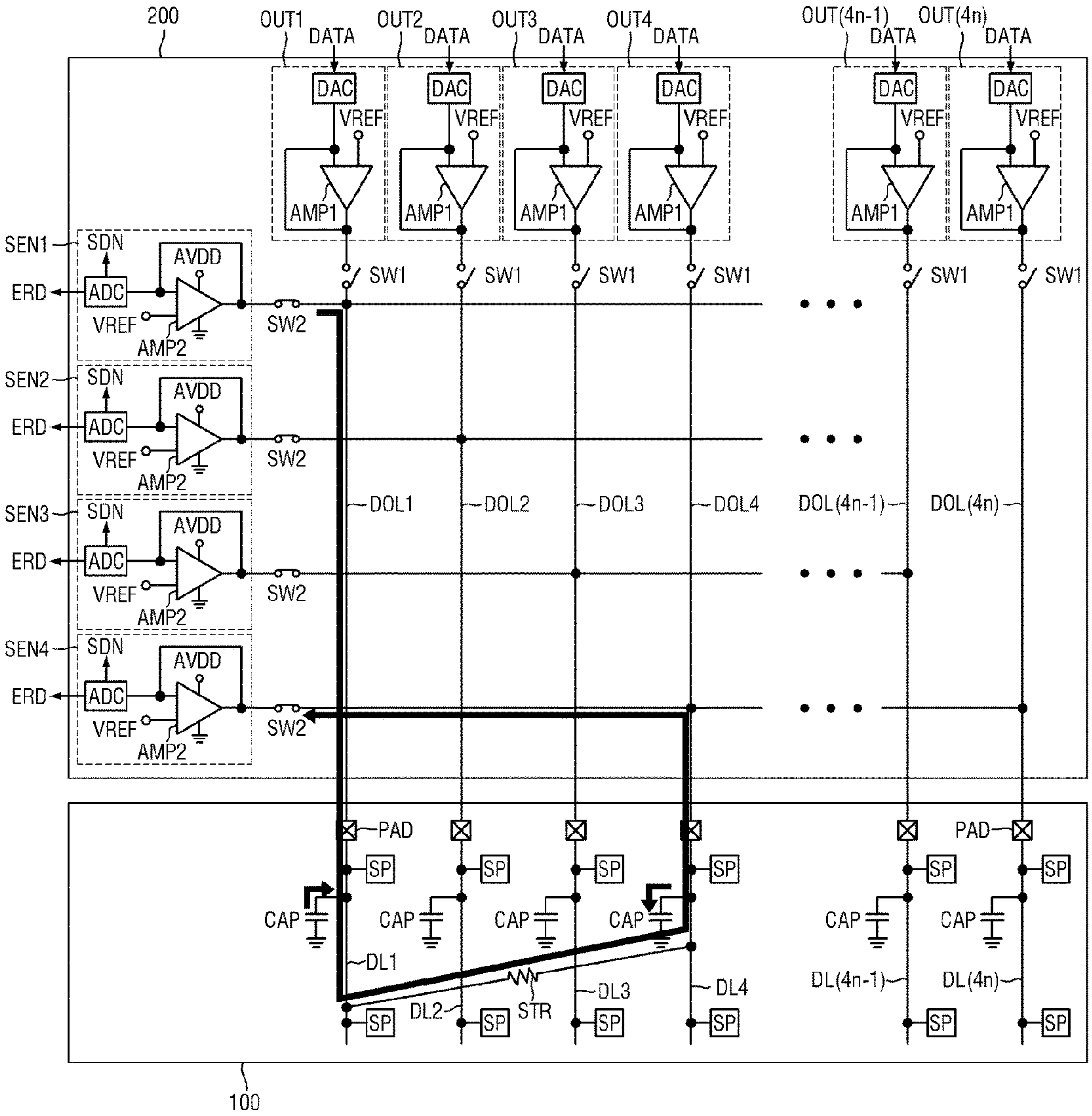
FIG. 7 is a schematic diagram showing an example of a process of sensing a short-circuit between data lines in the display device according to an embodiment.

FIG. 7 is a schematic diagram showing an example of a process of sensing a short-circuit between data lines in a display device according to an embodiment.

Referring to FIGS. 6 and 7, the sensing unit SEN may sense or detect a short-circuit (or a short-circuit current) between the data lines DL, e.g., during the sensing period SEP or the rest period VBP. The line capacitors CAP respectively connected to the first to fourth data lines DL1, DL2, DL3, and DL4 may store therein voltages of different magnitudes (or levels). For example, the magnitude (or level) of the first charging voltage VC1 may be greater than the magnitude (or level) of the fourth charging voltage VC4. When a short-circuit occurs between the first and fourth data lines DL1 and DL4, a short-circuit resistor STR may be connected to and disposed between the first and fourth data lines DL1 and DL4. For example, the short-circuit resistor STR may be formed in the path of the short-circuit current flowing between the first and fourth data lines DL1 and DL4. Since the first charging voltage VC1 is greater than the fourth charging voltage VC4, current may flow from the first data line DL1 to the fourth data line DL4. The line capacitor CAP of the first data line DL1 may be discharged when the line capacitor CAP of the fourth data line DL4 is charged. Accordingly, voltages of the first and fourth data lines DL1 and DL4 may be changed. The first sensing unit SEN1 may sense the change in the voltage (e.g., voltage change) of the first data line DL1, when the fourth sensing unit SEN4 senses the change in the voltage of the fourth data line DL4. The first sensing unit SEN1 may receive a voltage lower than the first charging voltage VC1. The fourth sensing unit SEN4 may receive a voltage greater than the fourth charging voltage VC4.

Embodiments are not limited to the illustration of FIG. 7. When a short-circuit occurs between two of the first to fourth data lines DL1, DL2, DL3, and DL4, the sensing unit SEN may detect the two data lines DL between which the short-circuit occurs.

The display device 10 may include the first to fourth sensing units SEN1, SEN2, SEN3, and SEN4 to sense the short-circuit between the data lines DL that are not directly adjacent to each other. The display device 10 may include the first to fourth sensing units SEN1, SEN2, SEN3, and SEN4 to quickly charge the line capacitors CAP of the data lines DL, and detect quickly the short-circuit in the display panel 100. Accordingly, the display device 10 may preventing the fire in and/or damage to the display panel 100 to protect the display device 10 when the short-circuit occurs between the data lines DL.

Figure 8:
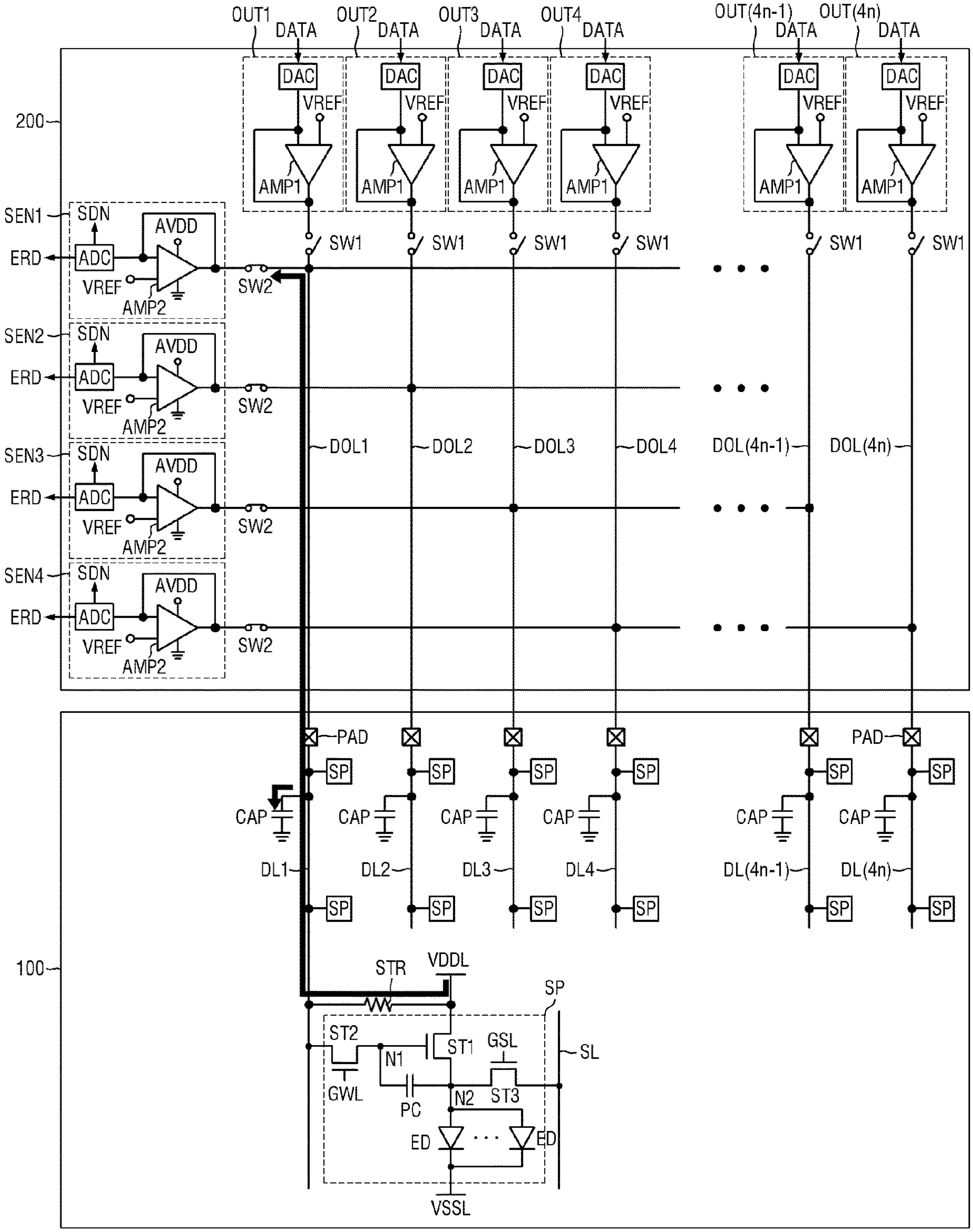
FIG. 8 is a schematic diagram showing an example of a process of sensing a short-circuit between a data line and a first voltage line in the display device according to an embodiment.

FIG. 8 is a schematic diagram showing an example of a process of sensing a short-circuit between the data line and the first voltage line in the display device according to an embodiment.

Referring to FIGS. 6 and 8, the sensing unit SEN may sense or detect a short-circuit (or a short-circuit current) between the data line DL and the first voltage line VDDL, e.g., during the sensing period SEP. When the short-circuit occurs between the first data line DL1 and the first voltage line VDDL, a short-circuit resistor STR may be connected to and disposed between the first data line DL1 and the first voltage line VDDL. For example, the short-circuit resistor STR may be formed in the path of the short-circuit current flowing between the first data line DL1 and the first voltage line VDDL. For example, the magnitude (or level) of the first voltage VDD may be greater than the magnitude (or level) of the first charging voltage VC1. Since the first voltage VDD is greater than the first charging voltage VC1, current may flow from the first voltage line VDDL to the first data line DL1. The line capacitor CAP of the first data line DL1 may be charged. Therefore, the voltage of the first data line DL1 may be changed. The first sensing unit SEN1 may sense the change in the voltage of the first data line DL1. Accordingly, the display device 10 may prevent fire in and/or damage to the display panel 100 to protect the display device 10 when the short-circuit occurs between the data line DL and the first voltage line VDDL.

Figure 9:
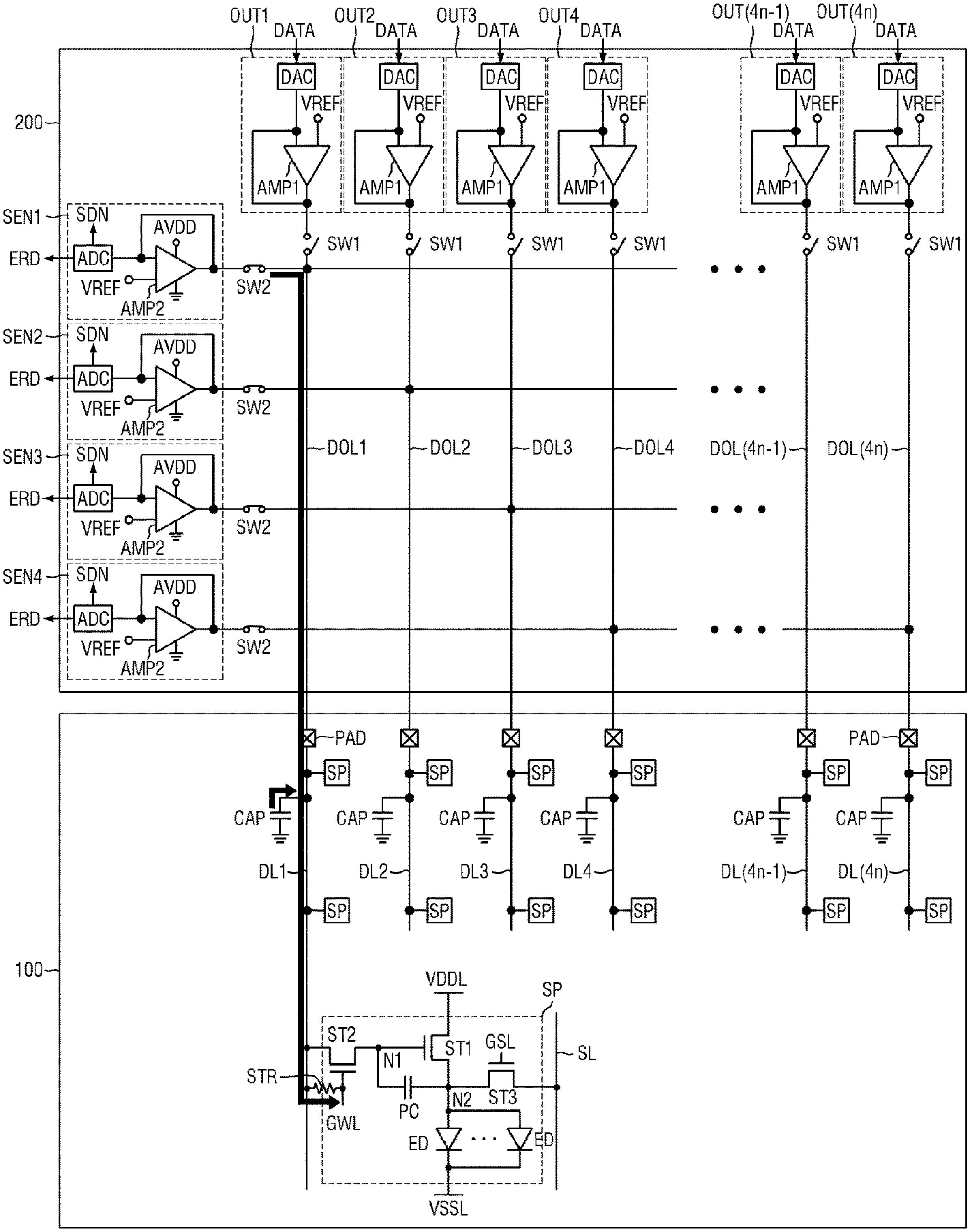
FIG. 9 is a schematic diagram showing an example of a process of sensing a short-circuit between a data line and a first gate line in the display device according to an embodiment.

FIG. 9 is a schematic diagram showing an example of a process of sensing a short-circuit between the data line and the first gate line in the display device according to an embodiment.

Referring to FIGS. 6 and 9, the sensing unit SEN may sense a short-circuit (or a short-circuit current) between the data line DL and the first gate line GWL, e.g., during the sensing period SEP. When a short-circuit occurs between the first data line DL1 and the first gate line GWL, a short-circuit resistor STR may be connected to and disposed between the first data line DL1 and the first gate line GWL. For example, the short-circuit resistor STR may be formed in the path of the short-circuit current flowing between the first data line DL1 and the first gate line GWL. For example, the magnitude (or level) of the first charging voltage VC1 may be greater than the magnitude (or level) of the first gate signal GW. Since the first charging voltage VC1 is greater than the first gate signal GW, a current may flow from the first data line DL1 to the first gate line GWL. Thus, the line capacitor CAP of the first data line DL1 may be discharged. Therefore, the voltage of the first data line DL1 may be changed. Thus, the first sensing unit SEN1 may sense the change in the voltage of the first data line DL1.

Embodiments are not limited to the illustration in FIG. 9. The sensing unit SEN may sense or detect a short-circuit between the data line DL and the second gate line GSL.

When a short-circuit occurs between the data line DL and the second gate line GSL, the sensing unit SEN may detect the data line DL, in which the short-circuit occurs, and may measure a location or a position of the short-circuit.

Accordingly, the display device 10 may prevent fire in and/or damage to the display panel 100 to protect the display device 10 when a short-circuit occurs between the data line DL and the first and/or second gate line GWL and/or GSL.

Figure 10:
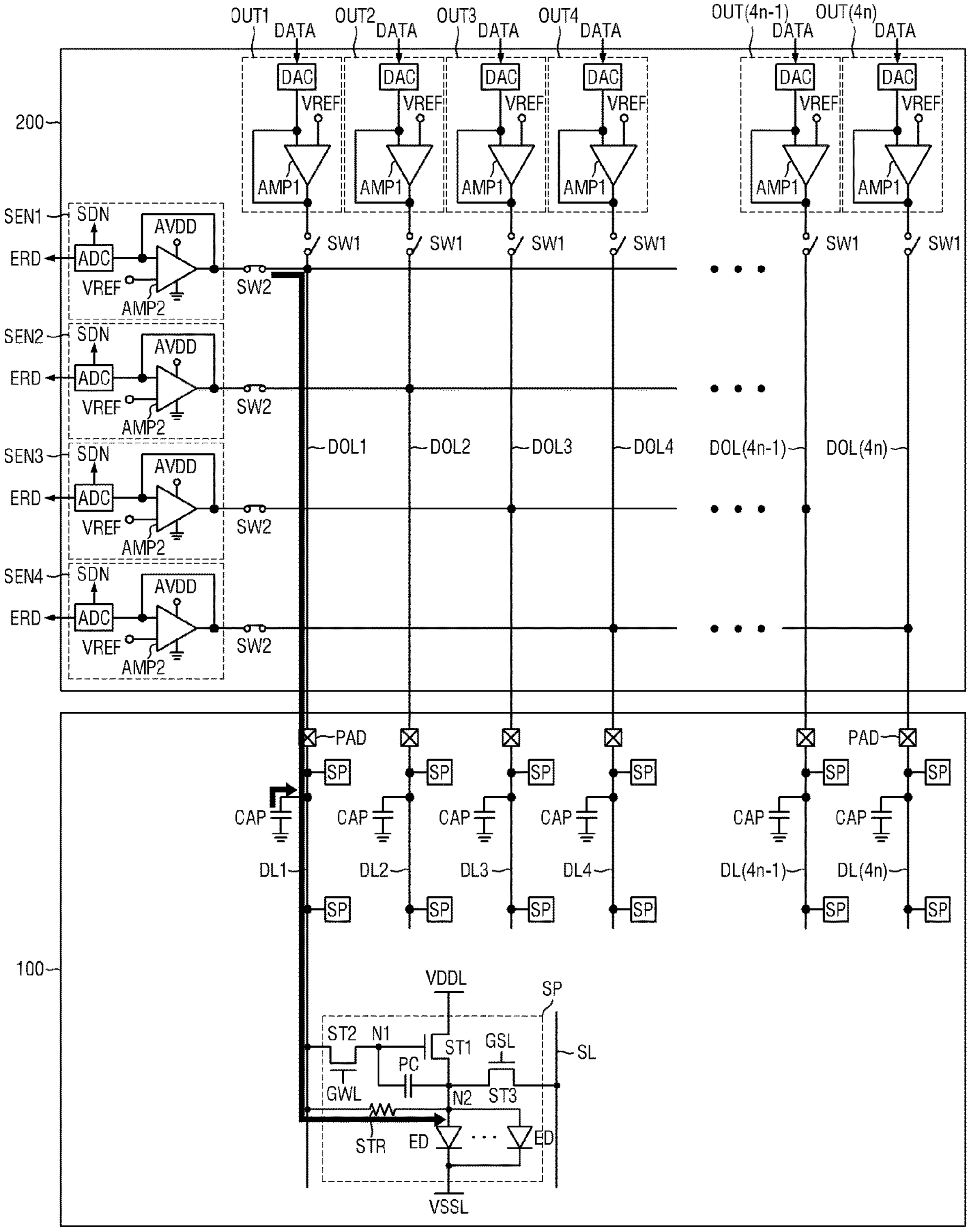
FIG. 10 is a schematic diagram showing an example of a process of sensing a short-circuit between a data line and a first electrode of a light-emitting element in the display device according to an embodiment.

FIG. 10 is a schematic diagram showing an example of a process of sensing a short-circuit between the data line and the first electrode of the light-emitting element in the display device according to an embodiment.

Referring to FIGS. 6 and 10, the sensing unit SEN may sense a short-circuit (or a short-circuit current) between the data line DL and the second node N2 as the first electrode of the light-emitting element ED, e.g., during the sensing period SEP. When a short-circuit occurs between the first data line DL1 and the first electrode of the light-emitting element ED, a short-circuit resistor STR may be connected to and disposed between the first data line DL1 and the second node N2. For example, the short-circuit resistor STR may be formed in the path of the short-circuit current flowing between the first data line DL1 and the second node N2. For example, the magnitude (or level) of the first charging voltage VC1 may be greater than the magnitude (or level) of the voltage of the second node N2. Since the first charging voltage VC1 is greater than the voltage of the second node N2, a current may flow from the first data line DL1 to the second node N2. Thus, the line capacitor CAP of the first data line DL1 may be discharged. Therefore, the voltage of the first data line DL1 may be changed. Thus, the first sensing unit SEN1 may sense or detect the change in the voltage of the first data line DL1. Accordingly, when a short-circuit occurs between the data line DL and the first electrode of the light-emitting element ED, the display device 10 may prevent fire in and/or damage to the display panel 100 to protect the display device 10.

Figure 11:
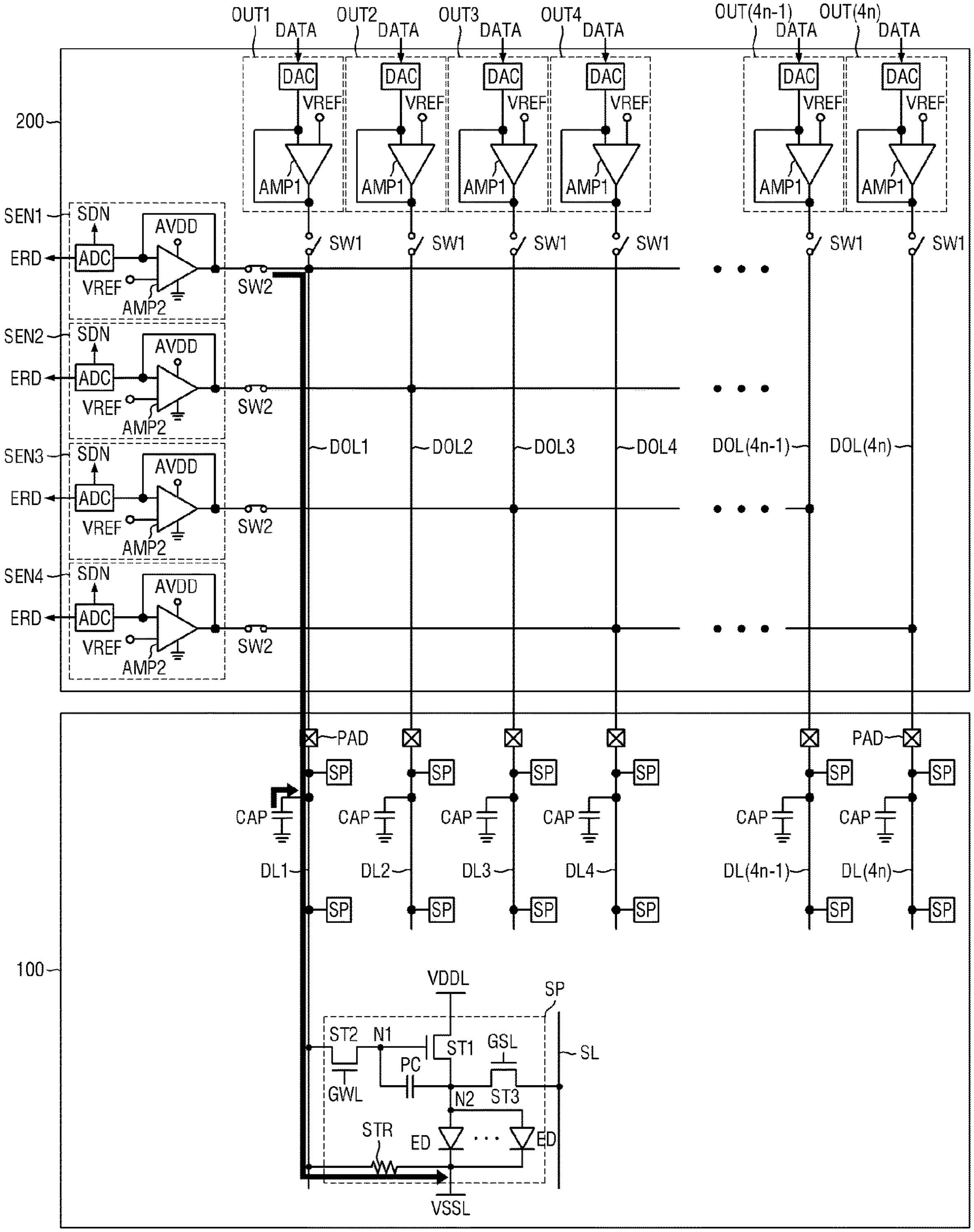
FIG. 11 is a schematic diagram showing an example of a process of sensing a short-circuit between a data line and a second voltage line in the display device according to an embodiment.

FIG. 11 is a schematic diagram showing an example of a process of sensing a short-circuit between the data line and the second voltage line in the display device according to an embodiment.

Referring to FIGS. 6 and 11, the sensing unit SEN may sense a short-circuit (or a short-circuit current) between the data line DL and the second voltage line VSSL, e.g., during the sensing period SEP. When a short-circuit occurs between the first data line DL1 and the second voltage line VSSL, a short-circuit resistor STR may be connected to and disposed between the first data line DL1 and the second voltage line VSSL. For example, the short-circuit resistor STR may be formed in the path of the short-circuit current flowing between the first data line DL1 and the second voltage line VSSL. For example, the magnitude (or level) of the first charging voltage VC1 may be greater than the magnitude (or level) of the second voltage VSS. Since the first charging voltage VC1 is greater than the second voltage VSS, the current may flow from the first data line DL1 to the second voltage line VSSL. Thus, the line capacitor CAP of the first data line DL1 may be discharged. Therefore, the voltage of the first data line DL1 may be changed. Thus, the first sensing unit SEN1 may sense the change in the voltage of the first data line DL1.

Accordingly, the display device 10 may prevent fire in and/or damage to the display panel 100 to protect the display device 10 when a short-circuit occurs between the data line DL and the second voltage line VSSL.

Figure 12:
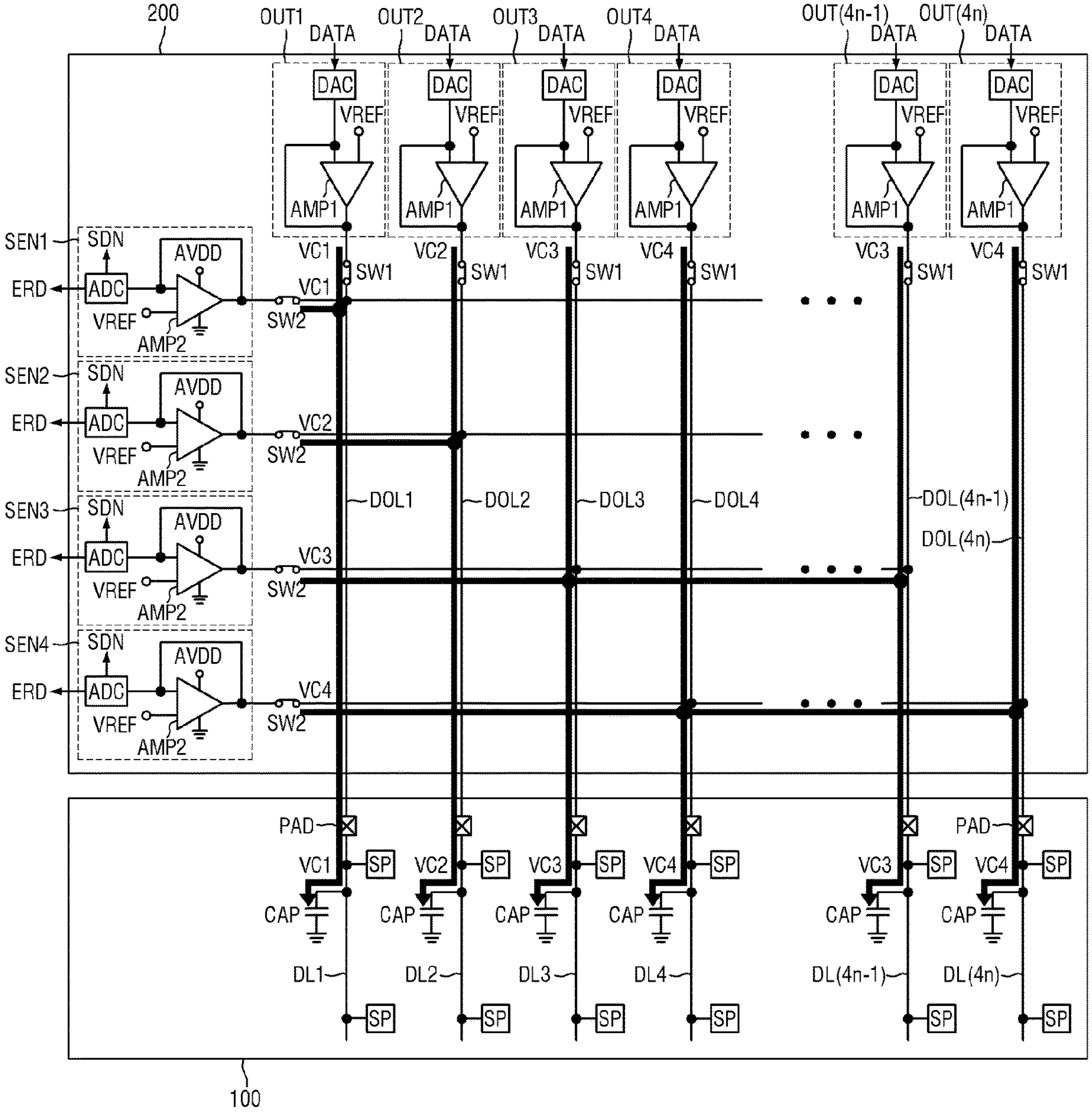
FIG. 12 is a schematic diagram showing an example of a process of charging the line capacitor of the display panel in the display device according to an embodiment.

FIG. 12 is a schematic diagram showing an example of a process of charging the line capacitor of the display panel in the display device according to an embodiment.

Referring to FIG. 12, each of the output units OUT may supply a charging voltage to a corresponding data output line DOL when the first switching element SW1 is turned on. Each of the sensing units SEN may supply the charging voltage to a corresponding data output line DOL when the second switching element SW2 is turned on. The charging voltage may be charged in the line capacitor CAP via the data output line DOL, the pad PAD, and the data line DL. The output unit OUT may include the first to 4n-th output units OUT1 to OUT(4n). Each of the first to 4n-th output unit OUT1 to OUT(4n) may be electrically connected to a corresponding data output line DOL among the first to 4n-th data output lines DOL1 to DOL(4n).

The first, the fifth, . . . , the (4n−3)-th output unit OUT1, OUT5, . . . , OUT(4n−3) may supply the first charging voltage VC1 to the first, the fifth, . . . , the (4n−3)-th data output lines DOL1, DOL5, . . . , DOL(4n−3), respectively. The first charging voltage VC1 may be charged in the line capacitor CAP connected to the first, the fifth, . . . , the (4n−3)-th data lines DL1, DL5, . . . , DL(4n−3). The second, the sixth, . . . , the (4n−2)-th output units OUT2, OUT6, . . . , OUT(4n−2) may supply the second charging voltage VC2 the second, the sixth, . . . , the (4n−2)-th data output lines DOL2, DOL6, . . . , DOL(4n−2), respectively. The second charging voltage VC2 may be charged in the line capacitor CAP connected to the second, the sixth, . . . , the (4n−2)-th data lines DL2, DL6, . . . , DL(4n−2). The third, the seventh, . . . , the (4n−1)-th output unit OUT3, OUT7, . . . , OUT(4n−1) may supply the third charging voltage VC3 to the third, the seventh, . . . , the (4n−1)-th data output lines DOL3, DOL7, . . . , DOL(4n−1), respectively. The third charging voltage VC3 may be charged in the line capacitor CAP connected to the third, the seventh, . . . , the (4n−1)-th data lines DL3, DL7, . . . , DL(4n−1). The fourth, the eighth, . . . , the 4n-th output units OUT4, OUT8, . . . , OUT(4n) may supply the fourth charging voltage VC4 to the fourth, the eighth, . . . , the 4n-th data output lines DOL4, DOL8, . . . , DOL(4n), respectively. The fourth charging voltage VC4 may be charged in the line capacitor CAP connected to the fourth, the eighth, . . . , the 4n-th data lines DL4, DL8, . . . , DL(4n).

The sensing unit SEN may include the first to fourth sensing units SEN1, SEN2, SEN3, and SEN4. The first sensing unit SEN1 may supply the first charging voltage VC1 to the first, the fifth, . . . , the (4n−3)-th data output lines DOL1, DOL5, . . . , DOL(4n−3). The second sensing unit SEN2 may supply the second charging voltage VC2 to the second, the sixth, . . . , the (4n−2)-th data output lines DOL2, DOL6, . . . , DOL(4n−2). The third sensing unit SEN3 may supply the third charging voltage VC3 to the third, the seventh, . . . , the (4n−1)-th data output lines DOL3, DOL7, . . . , DOL(4n−1). The fourth sensing unit SEN4 may supply the fourth charging voltage VC4 to the fourth, the eighth, . . . , the 4n-th data output lines DOL4, DOL8, . . . DOL(4n).

Therefore, the data driver 200 may supply the charging voltage to the data lines DL via the output units OUT and sensing units SEN to quickly charge the line capacitors CAP of the data lines DL. Thus, the short-circuit in the display panel 100 may be detected quickly.

The magnitudes (or levels) of the first to fourth charging voltages VC1, VC2, VC3, and VC4 may be different from each other. Accordingly, the line capacitors CAP respectively connected to the first to fourth data lines DL1, DL2, DL3, and DL4 may store voltages of different magnitudes (or levels) therein.

Figure 13:
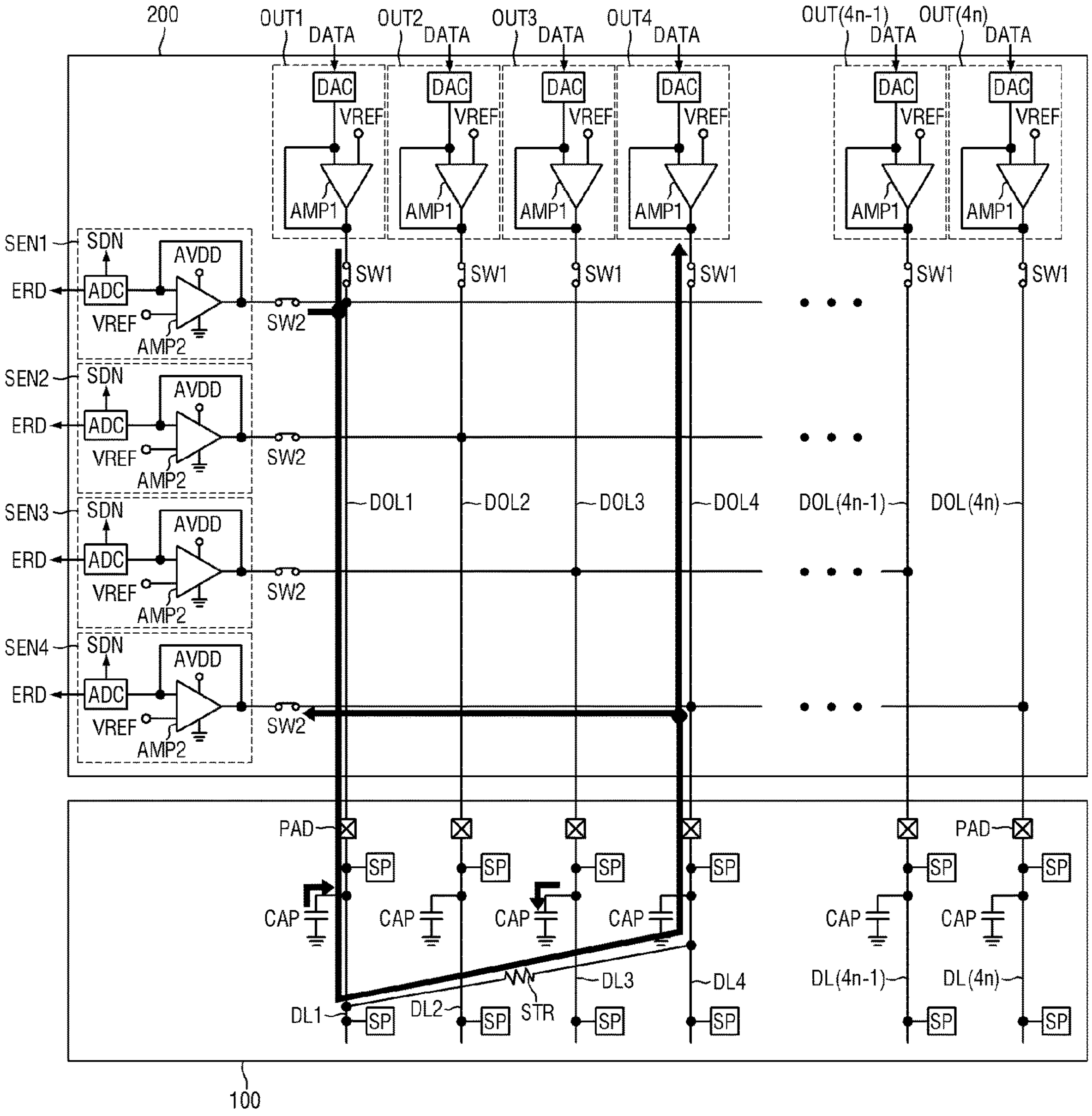
FIG. 13 is a schematic diagram showing an example of a process of sensing a short-circuit between data lines in the display device according to an embodiment.

FIG. 13 is a schematic diagram showing an example of a process of sensing a short-circuit between data lines in a display device according to an embodiment.

Referring to FIGS. 12 and 13, the output unit OUT and the sensing unit SEN may sense or detect a short-circuit (or a short-circuit current) between the data lines DL, e.g., during the sensing period SEP. The line capacitors CAP of the first to fourth data lines DL1, DL2, DL3, and DL4 may store therein voltages of different magnitudes (or levels). For example, the magnitude (or level) of the first charging voltage VC1 may be greater than the magnitude (or level) of the fourth charging voltage VC4. When a short-circuit occurs between the first and fourth data lines DL1 and DL4, a short-circuit resistor STR may be connected to and disposed between the first and fourth data lines DL1 and DL4. For example, the short-circuit resistor STR may be formed in the path of the short-circuit current flowing between the first and fourth data lines DL1 and DL4. Since the first charging voltage VC1 is greater than the fourth charging voltage VC4, current may flow from the first data line DL1 to the fourth data line DL4. Thus, the line capacitor CAP of the first data line DL1 may be discharged, when the line capacitor CAP of the fourth data line DL4 is charged. Accordingly, the voltages of the first and fourth data lines DL1 and DL4 may change. Thus, the first output unit OUT1 and the first sensing unit SEN1 may sense the change in the voltage of the first data line DL1, when the fourth output unit OUT4 and the fourth sensing unit SEN4 sense the change in the voltage of the fourth data line DL4.

Embodiments are not limited to the illustration of FIG. 13. When a short-circuit occurs between the first to fourth data lines DL1, DL2, DL3, and DL4, the output unit OUT and the sensing unit SEN may detect the data lines DL which between the short-circuit has occurred.

The display device 10 may include the output unit OUT and the sensing unit SEN to sense the short-circuit between the data lines DL that are not directly adjacent to each other. The display device 10 may include the output unit OUT and the sensing unit SEN to quickly charge line capacitors CAP of the data lines DL, and thus to detect quickly the short-circuit in the display panel 100. Accordingly, the display device 10 may prevent fire in and/or damage to the display panel 100 to protect the display device 10 when the short-circuit occurs between the data lines DL.

Figure 14:
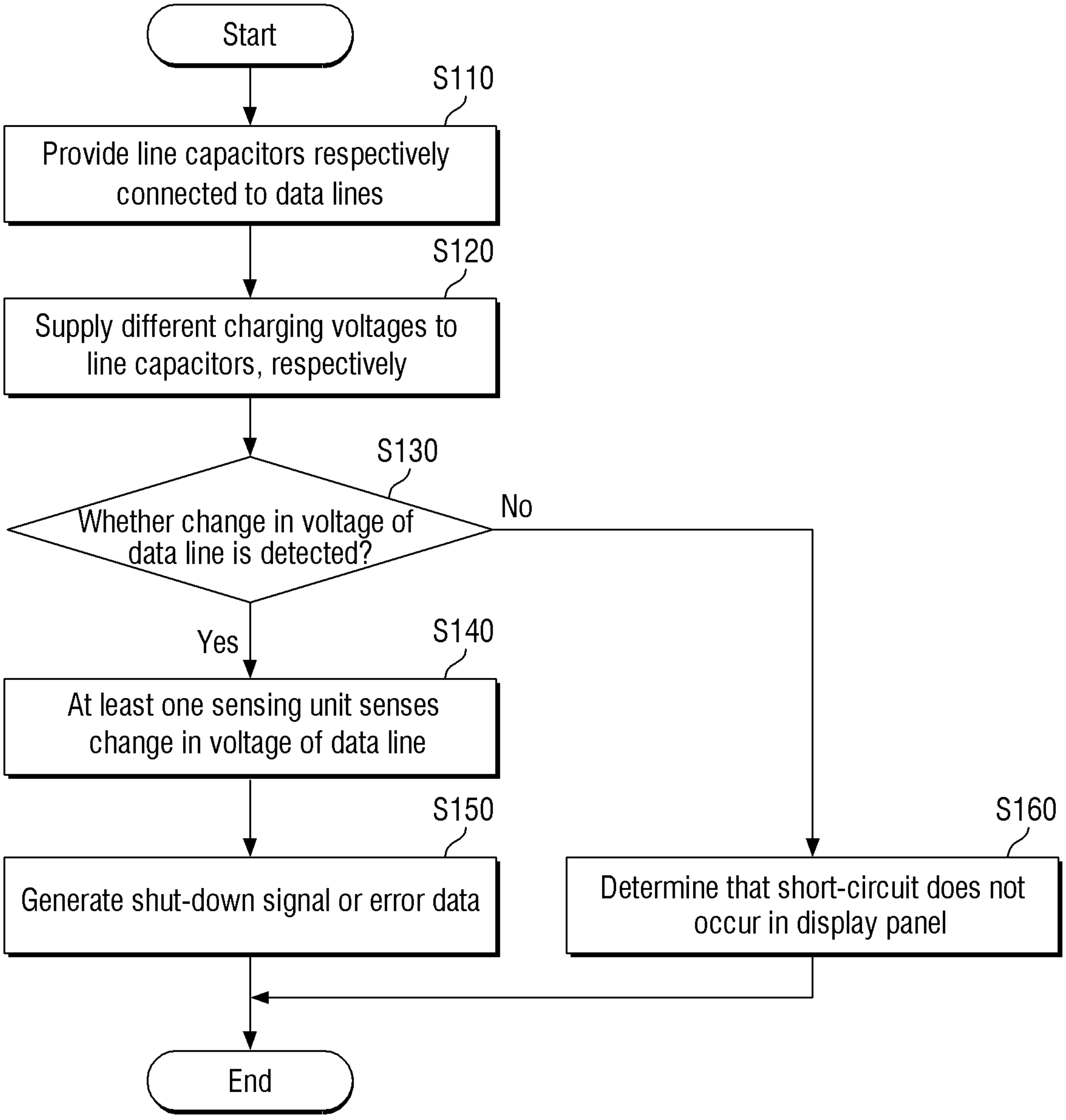
FIG. 14 is a flowchart showing an example of a process of sensing a short-circuit between data lines in the display device according to an embodiment.

FIG. 14 is a flowchart showing an example of a process of sensing a short-circuit between data lines in the display device according to an embodiment.

Referring to FIG. 14, the display panel 100 may include line capacitors CAP respectively connected to the data lines DL in S110. The line capacitor CAP may be connected to and disposed between the data line DL and the ground.

The sensing units SEN may supply different charging voltages to corresponding data lines DL, respectively. The first to fourth sensing units SEN1, SEN2, SEN3, and SEN4 may charge different charging voltages to the line capacitors CAP of the first to fourth data lines DL1, DL2, DL3, and DL4, respectively, in S120. For example, the first to fourth sensing units SEN1, SEN2, SEN3, and SEN4 may respectively output the first to fourth charging voltages VC1, VC2, VC3, and VC4. The first to fourth charging voltages VC1, VC2, VC3, and VC4 may be charged in the line capacitors CAP of the first to fourth data lines DL1, DL2, DL3, and DL4, respectively. The magnitudes (or levels) of the first to fourth charging voltage VC1, VC2, VC3, and VC4 may be different from each other.

The sensing unit SEN may sense the change in the voltage of the data line DL in S130. When a short-circuit occurs in the display panel 100, the line capacitor CAP is charged or discharged. Thus, the voltage of the data line DL may be changed.

When the change in the voltage of the data line DL occurs, at least one sensing unit SEN may sense the change in the voltage of the data line DL in S140.

When the change in the voltage of the data line DL is sensed, the sensing unit SEN may generate the shut-down signal to stop the operation of the display panel 100, and may supply the error data ERD to the timing controller 300 in S150. When the timing controller 300 receives the error data ERD, the timing controller stops the operation of each of the data driver 200 and the power supply 400, thereby preventing the display panel 100 from having fire therein and/or being damaged thereto, thereby protecting the display device 10.

When the change in the voltage of the data line DL is not sensed, the sensing unit SEN may determine that a short-circuit does not occur in the display panel 100 in S160. The data driver 200 and the power supply 400 may supply the signals and the voltages to the display panel 100 in a normal manner.

Figure 15:
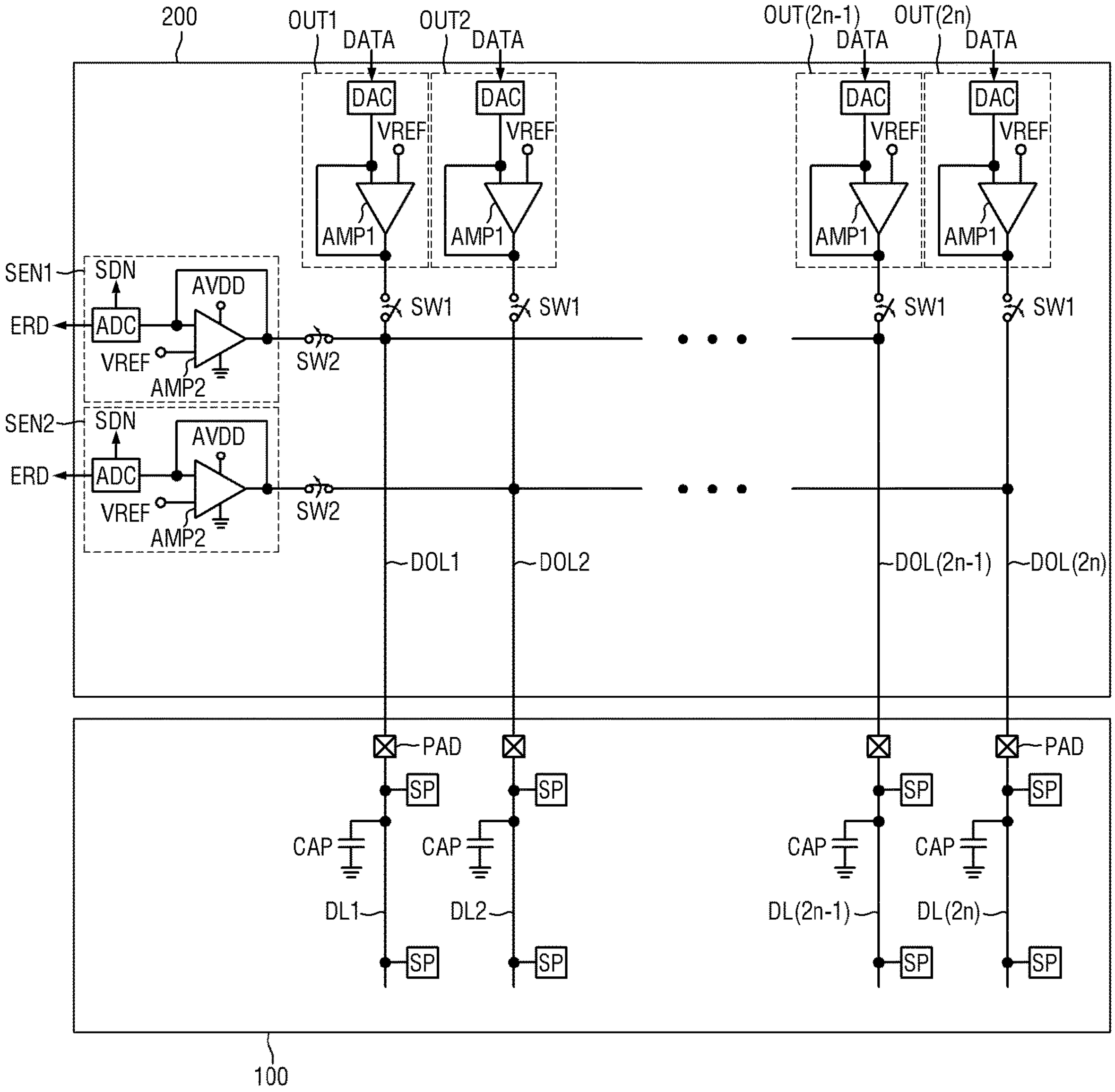
FIG. 15 is a schematic diagram showing a display panel and a data driver of a display device according to another embodiment.

FIG. 15 is a schematic diagram showing a display panel and a data driver of a display device according to another embodiment.

Referring to FIG. 15, a display panel 100 may include pixels SP, data lines DL, line capacitors CAP, and pads PAD. The pixels SP may be connected to the data line DL. The pixels SP arranged in the same column may be connected to one data line DL. The data line DL may be connected to and disposed between the pad PAD and the pixel SP. Each of the line capacitors CAP may be connected to a corresponding data line DL. The line capacitor CAP may be connected to and disposed between the data line DL and a ground.

The data driver 200 may include an output unit OUT (e.g., an output circuit), a sensor in the form of a sensing unit SEN, first and second switching elements SW1 and SW2, and a data output line DOL.

The output unit OUT may receive the digital video data DATA and output the data voltage. Each of the output units OUT may supply the data voltage to a corresponding data output line DOL when the first switching element SW1 is turned on. For example, the first switching element SW1 may be implemented as a transistor. However, embodiments are not limited thereto. The output unit OUT may include first to 2n-th output units OUT1 to OUT(2n) where n a positive integer. The data output line DOL may include first to 2n-th data output lines DOL1 to DOL(2n). The first output unit OUT1 may supply the data voltage to the first data output line DOL1. The 2n-th output unit OUT(2n) may supply the data voltage to the 2n-th data output line DOL (2n).

Each of the output units OUT may include a digital-to-analog converter DAC and a first amplifier AMP1. The digital-to-analog converter DAC may receive the digital video data DATA from the timing controller 300. The digital-to-analog converter DAC may convert the digital video data DATA into analog data to generate the data voltage. The digital-to-analog converter DAC may supply the data voltage to a first input terminal of the first amplifier AMP1.

The first input terminal of the first amplifier AMP1 may be connected to the digital-to-analog converter DAC. A second input terminal of the first amplifier AMP1 may receive a reference voltage VREF. The first input terminal of the first amplifier AMP1 may be connected to an output terminal of the first amplifier AMP1. The first amplifier AMP1 may operate or function as a buffer. The output terminal of the first amplifier AMP1 may be electrically connected to the data output line DOL via the first switching element SW1. Accordingly, the first amplifier AMP1 may supply the data voltage to the data output line DOL when the first switching element SW1 is turned on.

The sensing unit SEN may sense a short-circuit in the display panel 100. Each of the sensing units SEN may supply a charging voltage to a corresponding data output line DOL when the second switching element SW2 is turned on. For example, the second switching element SW2 may be implemented as a transistor. However, embodiments are not limited thereto. The charging voltage may be charged in the line capacitor CAP via the data output line DOL, the pad PAD, and the data line DL. The sensing unit SEN may include first and second sensing units SEN1 and SEN2. The first sensing unit SEN1 may be electrically connected to the first, the third, . . . , the (2n−1)-th data output line DOL1, DOL3, . . . , DOL(2n−1). The second sensing unit SEN2 may be electrically connected to the second, the fourth, . . . , the 2n-th data output lines DOL2, DOL4, . . . , DOL(2n).

Each of the sensing units SEN may include a second amplifier AMP2 and an analog-to-digital converter ADC. The second amplifier AMP2 may receive a third voltage AVDD, and may be connected to a ground. The second amplifier AMP2 may output a charging voltage based on the third voltage AVDD. A first input terminal of the second amplifier AMP2 may be connected to the analog-to-digital converter ADC. A second input terminal of the second amplifier AMP2 may receive a reference voltage VREF. The first input terminal of the second amplifier AMP2 may be connected to an output terminal of the second amplifier AMP2. The second amplifier AMP2 may operate as a buffer. The output terminal of the second amplifier AMP2 may be electrically connected to the data output line DOL via the second switching element SW2. Accordingly, the second amplifier AMP2 may supply the charging voltage to the data output line DOL when the second switching element SW2 is turned on.

The second amplifier AMP2 may sense the change in the voltage of the data line DL. When a short-circuit occurs in the display panel 100, the line capacitor CAP is charged or discharged. Thus, the voltage of the data line DL may be changed. The output terminal of the second amplifier AMP2 may sense the change in the voltage of the data line DL via the pad PAD, the data output line DOL, and the second switching element SW2. The output terminal of the second amplifier AMP2 may be connected to the first input terminal, so that the second amplifier AMP2 may supply an analog signal corresponding to the change in the voltage of the data line DL to the analog-to-digital converter ADC.

Embodiments are not limited to the illustration of FIG. 15. Each of the sensing units SEN may include second amplifiers AMP2. Each of the sensing units SEN includes the second amplifiers AMP2, thereby quickly and easily supplying the charging voltage to the data output line DOL. Thus, the change in the voltage of the data line DL may be precisely sensed.

The analog-to-digital converter ADC may generate the shut-down signal SDN and the error data ERD when the voltage of the data line DL changes. The analog-to-digital converter ADC may receive the analog signal corresponding to the change in the voltage of the data line DL from the second amplifier AMP2. The analog-to-digital converter ADC may convert the analog signal to digital data and may generate the shut-down signal SDN and the error data ERD based on the digital data. The shut-down signal SDN may stop an operation of the data driver 200 to stop an operation of the display panel 100. The analog-to-digital converter ADC may supply the error data ERD to the timing controller 300.

Figure 16:
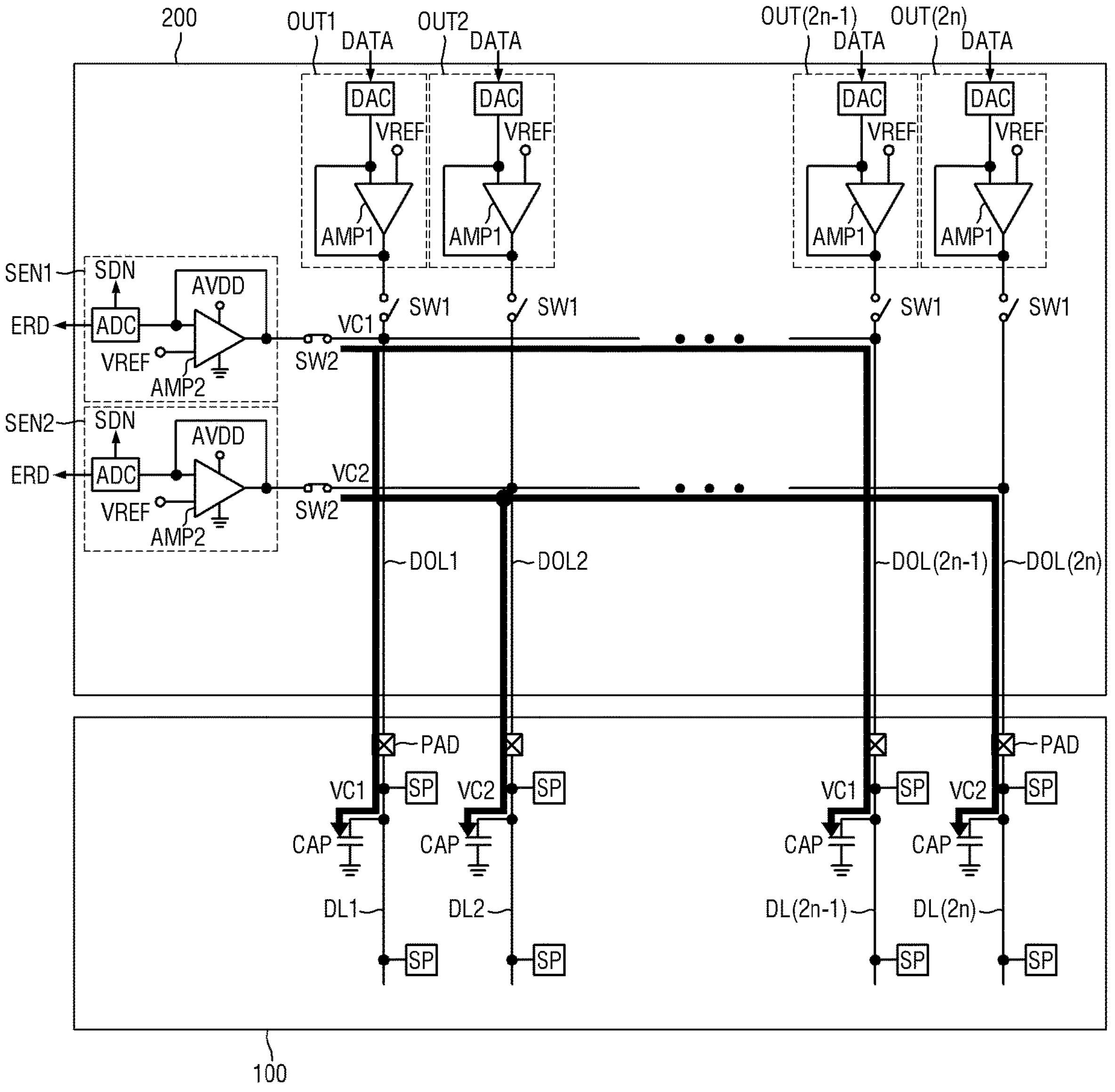
FIG. 16 is a schematic diagram showing an example of a process of charging a line capacitor of the display panel in the display device according to another embodiment.

FIG. 16 is a schematic diagram showing an example of a process of charging a line capacitor of the display panel in the display device according to another embodiment.

Referring to FIG. 16, each of the sensing units SEN may supply a charging voltage to a corresponding data output line DOL when the second switching element SW2 is turned on. For example, the second switching element SW2 may be implemented as a transistor. However, embodiments are not limited thereto. The charging voltage may be charged in the line capacitor CAP via the data output line DOL, the pad PAD, and the data line DL. The sensing unit SEN may include the first and second sensing units SEN1 and SEN2. The first sensing unit SEN1 may be electrically connected to the first, the third, . . . , the (2n−1)-th data output lines DOL1, DOL3, . . . , DOL(2n−1). The second sensing unit SEN2 may be electrically connected to the second, the fourth, . . . , the 2n-th data output lines DOL2, DOL4, . . . , DOL(2n).

The first sensing unit SEN1 may supply the first charging voltage VC1 to the first, the third, . . . , the (2n−1)-th data output line DOL1, DOL3, . . . , DOL(2n−1). The first charging voltage VC1 may be charged in the line capacitor CAP connected to the first, the third, . . . , the (2n−1)-th data lines DL1, DL3, . . . , DL(2n−1). The second sensing unit SEN2 may supply the second charging voltage VC2 to the second, the fourth, . . . , the 2n-th data output lines DOL2, DOL4, . . . , DOL(2n). The second charging voltage VC2 may be charged in the line capacitor CAP connected to the second, the fourth, . . . , the 2n-th data lines DL2, DL4, . . . , DL(2n).

The magnitudes (or levels) of the first and second charging voltages VC1 and VC2 may be different from each other. Accordingly, the line capacitors CAP respectively connected to the first and second data lines DL1 and DL2 may store therein voltages of different magnitudes (or levels).

Figure 17:
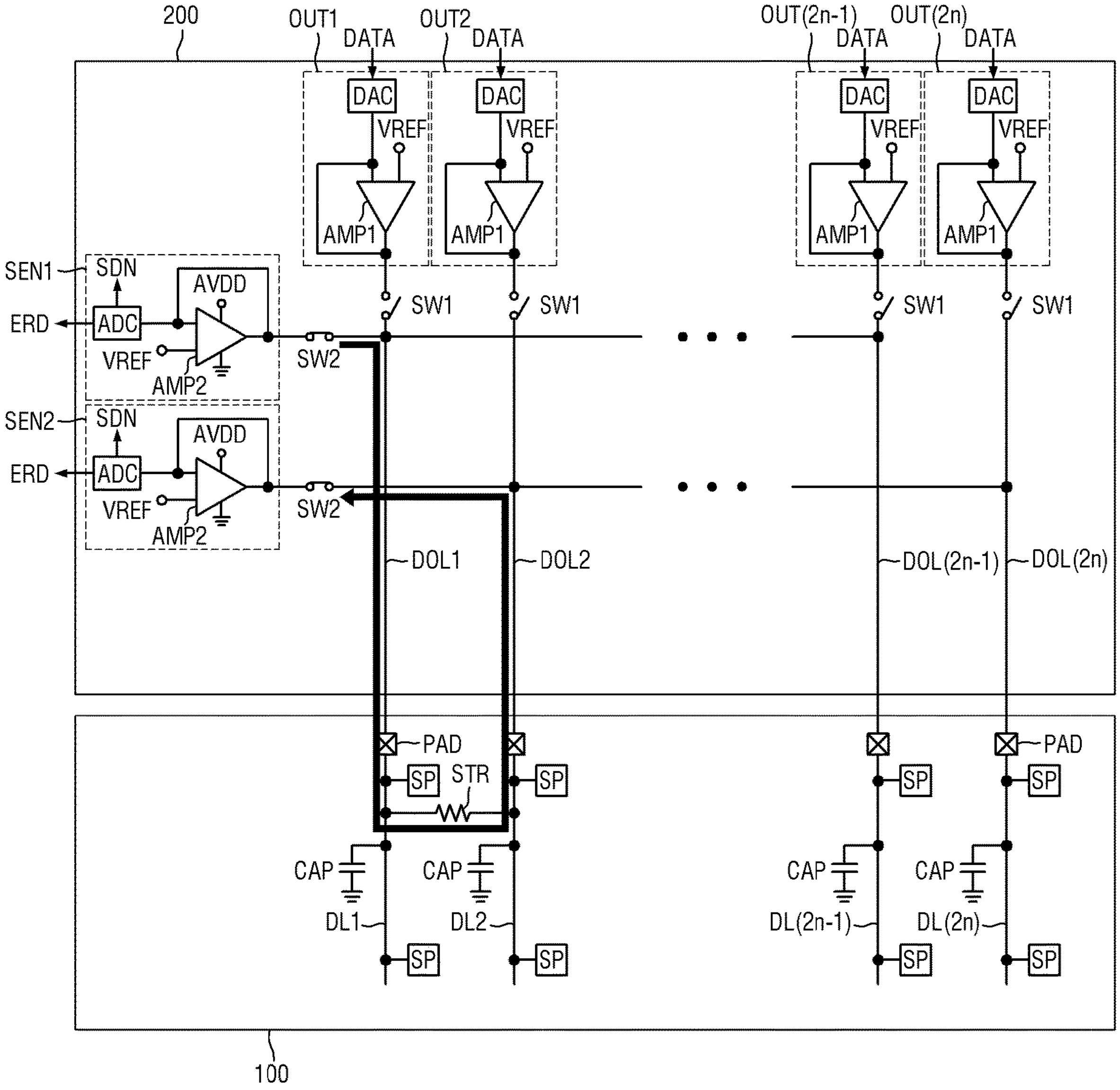
FIG. 17 is a schematic diagram showing an example of a process of sensing a short-circuit between data lines in the display device according to another embodiment.

FIG. 17 is a schematic diagram showing an example of a process of sensing a short-circuit between data lines in a display device according to another embodiment.

Referring to FIGS. 16 and 17, the sensing unit SEN may sense a short-circuit (or a short-circuit current) between the data lines DL, e.g., during the sensing period SEP. The line capacitors CAP of the first and second data lines DL1 and DL2 may store therein voltages of different magnitudes (or levels). For example, the magnitude (or level) of the first charging voltage VC1 may be greater than the magnitude (or level) of the second charging voltage VC2. When a short-circuit occurs between the first and second data lines DL1 and DL2, a short-circuit resistor STR may be connected to and disposed between the first and second data lines DL1 and DL2. For example, the short-circuit resistor STR may be formed in the path of the short-circuit current flowing between the first and second data lines DL1 and DL2. Since the first charging voltage VC1 is greater than the second charging voltage VC2, a current may flow from the first data line DL1 to the second data line DL2. Thus, the line capacitor CAP of the first data line DL1 may be discharged, when the line capacitor CAP of the second data line DL2 is charged. Accordingly, the voltages of the first and second data lines DL1 and DL2 may change. Thus, the first sensing unit SEN1 may sense the change in the voltage of the first data line DL1, when the second sensing unit SEN2 senses the change in the voltage of the second data line DL2.

The display device 10 may include the first and second sensing units SEN1 and SEN2 to sense the short-circuit between adjacent data lines DL. The display device 10 may include the first and second sensing units SEN1 and SEN2, thereby charging the line capacitors CAP of the data lines DL, and detecting the short-circuit in the display panel 100. Accordingly, the display device 10 may prevent fire in and/or damage to the display panel 100 to protect the display device 10 when the short-circuit occurs between the data lines DL.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display device comprising:
- a display panel comprising:
- data lines;
- line capacitors respectively connected to the data lines; and
- pixels receiving a data voltage from the data lines; and
- a data driver supplying the data voltage to the pixels through the data lines and supplying different charging voltages respectively to the line capacitors through the data lines,
- wherein the data driver senses voltage change of at least one of the data lines occurring in case that at least one of the line capacitors is charged or discharged,
- the data driver including an output unit comprising:
  - a digital-to-analog converter;
  - a first amplifier including:
    - an output terminal connected to a data line of the data lines,
    - a first input terminal connected to the digital-to-analog converter, and
    - a second input terminal directly receiving a reference voltage, wherein
- the first input terminal of the first amplifier connected to the output terminal of the first amplifier.

2. The device of claim 1, wherein the data driver comprises:
- a plurality of output units supplying the data voltage to the data lines; and
- a plurality of sensors supplying the different charging voltages to the line capacitors, respectively.

3. The device of claim 2, wherein each of the plurality of output units comprises:
- the digital-to-analog converter converting digital video data into analog data and generating the data voltage based on the analog data.

4. The device of claim 2, wherein the plurality of sensors comprise:
- a first sensor supplying a first charging voltage to a first data line of the data lines; and
- a second sensor supplying a second charging voltage different from the first charging voltage to a second data line of the data lines.

5. The device of claim 4, wherein each of the first and second sensors comprises:
- a second amplifier outputting the charging voltage and sensing the voltage change of the at least one of the data lines; and
- an analog-to-digital converter connected to the second amplifier converting an analog signal corresponding to the voltage change of the at least one of the data lines into digital data.

6. The device of claim 5, wherein the analog-to-digital converter generates a shut-down signal to stop an operation of the data driver in case that the voltage change of the at least one of the data lines is detected.

7. The device of claim 5, further comprising:
- a timing controller supplying digital video data to the data driver,
  - wherein the analog-to-digital converter supplies error data to the timing controller in case that the voltage change of the at least one of the data lines is detected.

8. The device of claim 5, wherein
- the second amplifier including:
  - an output terminal connected to the data line; and
- an input terminal connected to the analog-to-digital converter, wherein
- the input terminal of the second amplifier connected to the output terminal of the second amplifier, the second amplifier configured to supply the analog signal based on the voltage change.

9. The device of claim 4, wherein the plurality of sensors further comprise a third sensor supplying a third charging voltage different from the first and second charging voltages to a third data line of the data lines.

10. The device of claim 9, wherein the first and third sensors sense a short-circuit between the first and third data lines spaced apart from each other by the second data line interposed therebetween.

11. The device of claim 2, further comprises:
- a first voltage line supplying a first voltage to the pixels;
- a gate line supplying a gate signal to the pixels; and
- a second voltage line supplying a second voltage lower than the first voltage to the pixels,
- wherein each of the pixels includes a light-emitting element.

12. The device of claim 11, wherein at least one of the plurality of sensors senses the voltage change of the at least one of the data lines that is caused by charging the at least one of the line capacitors through a short-circuit between the first voltage line and the at least one of the data lines.

13. The device of claim 11, wherein at least one of the plurality of sensors senses the voltage change of the at least one of the data lines that is caused by discharging the at least one of the line capacitors through a short-circuit between the gate line and the at least one of the data lines.

14. The device of claim 11, wherein at least one of the plurality of sensors senses the voltage change of the at least one of the data lines that is caused by discharging the at least one of the line capacitors through a short-circuit between a first electrode of the light-emitting element and the at least one of the data lines.

15. The device of claim 11, wherein at least one of the plurality of sensors senses the voltage change of the at least one of the data lines that is caused by discharging the at least one of the line capacitors through a short-circuit between the second voltage line and the at least one of the data lines.

16. The device of claim 2, wherein each of the plurality of output units supplies the data voltage to the pixels during a data addressing period of a frame period, and supply the different charging voltages respectively to the line capacitors during a rest period of the frame period.

17. The device of claim 1, wherein the data lines connected to and disposed between a pad and the pixels.

18. A display device comprising:

a display panel comprising:

first and second data lines, line capacitors respectively connected to the first and second data lines, and pixels receiving a data voltage from the first and second data lines;

first and second output units supplying the data voltage to the pixels through the first and second data lines, respectively;

a first sensor supplying a first charging voltage to the line capacitor connected to the first data line; and a second sensor supplying a second charging voltage different from the first charging voltage to the line capacitor connected to the second data line, wherein at least one of the first and second sensors senses voltage change of the first or second data line in case that at least one of the line capacitors is charged or discharged, each of the first and second sensors comprising:

an analog-to-digital converter;

an amplifier including:

a first input terminal connected to the analog-to-digital converter;

a second input terminal received a reference voltage; and an output terminal connected to the first input terminal and a data line of the first and second data lines.

19. The device of claim 18, wherein the first and second sensors sense a short-circuit between the first and second data lines.

20. The device of claim 18, wherein the display panel further comprises a third data line, and the device further comprises a third sensor supplying a third charging voltage different from the first and second charging voltages to the third data line.

21. The device of claim 20, wherein the first and third sensors sense a short-circuit between the first and third data lines spaced apart from each other by the second data line interposed therebetween.

22. A display device comprising:

a display panel comprising:

data lines;

line capacitors respectively connected to and disposed between the data lines and ground; and pixels receiving a data voltage from the data lines; and a data driver supplying the data voltage to the pixels through the data lines and supplying different charging voltages respectively to the line capacitors through the data lines, wherein the data driver receives:

a first voltage higher than the charging voltage of at least one of the line capacitors, the first voltage increased from the charging voltage by charging the at least one of the line capacitors through a short-circuit occurred in the display panel; or a second voltage lower than the charging voltage of the at least one of the line capacitors, the second voltage decreased from the charging voltage by discharging the at least one of the line capacitors through the short-circuit occurred in the display panel, the data driver including an output unit comprising:

a digital-to-analog converter;

a first amplifier including:

an output terminal connected to a data line of the data lines, a first input terminal connected to the digital-to-analog converter, and a second input terminal directly receiving a reference voltage, wherein the first input terminal of the first amplifier connected to the output terminal of the first amplifier.

* * * * *